United States Patent [19]
Itoh

[11] Patent Number: 6,042,234
[45] Date of Patent: Mar. 28, 2000

[54] POLARIZED LIGHT ILLUMINATION DEVICE AND PROJECTION DISPLAY DEVICE

[75] Inventor: Yoshitaka Itoh, Suwa, Japan

[73] Assignee: Seiko Epson Corporation, Tokyo, Japan

[21] Appl. No.: 09/251,346

[22] Filed: Feb. 17, 1999

[30] Foreign Application Priority Data

Feb. 18, 1998 [JP] Japan .................................. 10-036481

[51] Int. Cl.⁷ .......................... G03B 21/14; G03B 21/00; G02F 1/1335
[52] U.S. Cl. .................................. 353/20; 353/8; 353/31; 353/94; 349/9
[58] Field of Search ........................... 355/71, 32; 353/8, 353/20, 94, 31, 33, 34, 37; 349/9, 8, 68

[56] References Cited

U.S. PATENT DOCUMENTS

| | | |
|---|---|---|
| 5,295,018 | 3/1994 | Konuma et al. . |
| 5,446,510 | 8/1995 | Mitsutake et al. ......................... 353/20 |
| 5,765,934 | 6/1998 | Okamori et al. ........................... 353/94 |

FOREIGN PATENT DOCUMENTS

| | | |
|---|---|---|
| 0 753-780 | 1/1997 | European Pat. Off. . |
| 0 857-986 | 8/1998 | European Pat. Off. . |
| 7-244282 | 9/1995 | Japan . |
| 8-029734 | 2/1996 | Japan . |
| 8-211329 | 8/1996 | Japan . |
| 8-220475 | 8/1996 | Japan . |

*Primary Examiner*—Safet Metjahic
*Assistant Examiner*—Khold Brown
*Attorney, Agent, or Firm*—Oliff & Berridge, PLC

[57] ABSTRACT

A polarized light illumination device that is able to utilize both polarized light components by using a plurality of light sources without increasing the illumination angle, and a projection display device that is able to project a considerably bright projection image are provided. In a polarized light illumination device, randomly polarized light emitted from first and second light sources is directionally separated into two types of polarized light by a polarized light separating and synthesizing optical element, secondary light-source images, which are offset in the x direction, are formed, and then, the direction of polarization is aligned. In this case, at least two of first to third light-collecting mirror plates are shifted in parallel from about the center axis of the polarized light separating and synthesizing optical element so that secondary light-source images of s-polarized light in emitting light from the first and second light sources overlap each other, and so that secondary light-source images of p-polarized light overlap each other.

20 Claims, 15 Drawing Sheets

POLARIZED LIGHT ILLUMINATION DEVICE AND PROJECTION DISPLAY DEVICE

BACKGROUND OF THE INVENTION

1. Field of Invention

The present invention relates to a polarized light illumination device for uniformly illuminating a rectangular illumination area and the like by using polarized light polarized in the same direction, and to a projection display device using the polarized light illumination device. More particularly, the present invention relates to a structural technique of synthesizing light emitted from two light sources while aligning the polarization directions of the light.

2. Description of Related Art

A liquid crystal display device using a modulation element of a type that modulates a specific polarized light, such as a liquid crystal element, can utilize only one of two polarized light components included in light emitted from a light source. Therefore, there is a need to enhance light utilization efficiency in order to obtain a bright projection image. Since a projection display device using a single light source has a limited ability to enhance light utilization efficiency, the amount of light has been increased by using a plurality of light sources as a means for obtaining a bright image.

When simply a plurality of light sources are arranged, the area of a light-source image is increased by a plurality of times, and the angle distribution of light for illuminating an illumination area is also increased (the illumination angle is increased), whereas the amount of light per given area is the same as that in the case where a single light source is used. Consequently, in this case, the amount of light per given area is not practically increased even when a plurality of light sources are used.

If the amount of light is increased by using a plurality of light sources, when only one of two types of polarized light components, which are included in light emitted from the light sources, can be used, half the light is wasted, which reduces the effectiveness by half.

SUMMARY OF THE INVENTION

Accordingly, an object of the present invention is to provide a polarized light illumination device that is able to utilize both polarized light components by using a plurality of light sources, without increasing the illumination angle, and to provide a projection display device that is able to project a considerably bright projection image.

In order to achieve the above object, the present invention provides a polarized light illumination device including a polarized light separating and synthesizing optical element having a first polarization separating film that separates light, incident from a first side, into the two types of polarized lights, emits one of the two types of polarized lights toward a third side, and emits another of the two types of polarized lights toward a fourth side, and a second polarization separating film that separates light, incident from a second side, into the two types of polarized lights, emits one of the two types of polarized lights toward the fourth side, and emits another of the two types of polarized lights toward a fifth side; a first light source and a second light source that cause light to enter the first side and the second side of the polarized light separating and synthesizing optical element, respectively; a first light collecting and reflecting optical element disposed on the third side of the polarized light separating and synthesizing optical element and having a plurality of small light collecting and reflecting elements that approximately reverse a direction of travel of respective incident light and forming a focal image; a second light collecting and reflecting optical element disposed on the fourth side of the polarized light separating and synthesizing optical element and having a plurality of small light collecting and reflecting elements that approximately reverse a direction of travel of respective incident light and forming a focal image; a third light collecting and reflecting optical element disposed on the fifth side of the polarized light separating and synthesizing optical element and having a plurality of small light collecting and reflecting elements that approximately reverse a direction of travel of respective incident light and forming a focal image; a first polarization-state conversion optical element disposed between the third side of the polarized light separating and synthesizing optical element and the first light collecting and reflecting optical element; a second polarization-state conversion optical element disposed between the fourth side of the polarized light separating and synthesizing optical element and the second light collecting and reflecting optical element; a third polarization-state conversion optical element disposed between the fifth side of the polarized light separating and synthesizing optical element and the third light collecting and reflecting optical element; and a polarization conversion optical element, disposed on a sixth side of the polarized light separating and synthesizing optical element, that aligns a polarization direction of light emitted from the polarized light separating and synthesizing optical element, a first principal ray of light, which is reflected by the small light collecting and reflecting elements of the first light collecting and reflecting optical element and the third light collecting and reflecting optical element and which enters the polarization conversion optical element, and a second principal ray of light, which is reflected by the small light collecting and reflecting elements of the second light collecting and reflecting optical element and which enters the polarization conversion optical element, being in parallel with each other and do not overlap each other.

In the polarized light illumination device of the present invention, randomly polarized light, emitted from first and second light sources which cause light to enter first and second surfaces of a polarized light separating and synthesizing optical element, is separated into two types of polarized light, namely, p-polarized light and s-polarized light, by the polarized light separating and synthesizing optical element. The respective polarized light is separated into a plurality of intermediate beams by first, second, and third light collecting and reflecting optical elements disposed on the sides of third, fourth, and fifth sides of the polarized light separating and synthesizing optical element. Furthermore, the polarization directions of the intermediate beams are aligned by a polarization conversion optical element disposed on the side of a sixth surface of the polarized light separating optical element. Therefore, although two light sources are used, the area of an illumination area to be illuminated can be made almost equal to that of the area to be illuminated by a single light source, without increasing the incident angle (illumination angle) of illumination light with respect to the illumination area. For this reason, the amount of light per given area can be about double that in the case where a single light source is used, and therefore, the illumination area can be illuminated more brightly. When the intermediate beams separated by the respective light collecting and reflecting optical elements are superimposed on one point in an illumination area, the illumination area can be uniformly illuminated. Therefore, when the polarizing illumination device of the present invention is used as a light source in a display device, a considerably uniform image can be obtained. Furthermore, in the polarized light illumination device of the present invention, randomly polarized light emitted from the first and second light sources can be aligned with p-polarized light, s-polarized light, or the like and synthesized with little loss. Therefore, when the polarized light illumination device of the present invention is adopted in a display device using a modulation element that modulates a specific polarized light, such as a liquid crystal element, a considerably bright image can be obtained. Furthermore, the principal ray of light, which is reflected by small light collecting and reflecting elements in the first light collecting and reflecting optical element and the third light collecting and reflecting optical element and enters the polarization conversion optical element, and the principal ray of light, which is reflected by small light collecting and reflecting elements in the second light collecting and reflecting optical element and enters the polarization conversion optical element, are in parallel with each other. This means that light reflected by the small light collecting and reflecting elements in the first to third light collecting and reflecting optical elements enters the polarized light separating and synthesizing optical element at almost the same angle. As a result, even when the polarized light separating and synthesizing characteristics of the polarized light separating and synthesizing optical element are apt to depend on the incident angle of light, it is possible to stably separate and synthesize polarized light, and to obtain nearly uniform illumination light.

In the present invention, the first light collecting and reflecting optical element is disposed nearly in parallel with the third side of the polarized light separating and synthesizing optical element; the second light collecting and reflecting optical element is disposed nearly in parallel with the fourth side of the polarized light separating and synthesizing optical element; the third light collecting and reflecting optical element is disposed nearly in parallel with the fifth side of the polarized light separating and synthesizing optical element; and the first light collecting and reflecting optical element, the second light collecting and reflecting optical element, and the third light collecting and reflecting optical element are arranged so that the first principal ray of light, which is reflected by the small light collecting and reflecting elements in the first light collecting and reflecting optical element and the third light collecting and reflecting optical element and which enters the polarization conversion optical element, and the second principal ray of light, which is reflected by the small light collecting and reflecting elements in the second light collecting and reflecting optical element and which enters the polarization conversion optical element, are in parallel with each other and do not overlap each other. By arranging the first, second and third light collecting and reflecting optical elements in such a manner, secondary light-source images of p-polarized light and s-polarized light can be formed at predetermined positions, which are spatially different, by the small light collecting and reflecting elements constituting the light collecting and reflecting optical elements.

The positions where the first to third light collecting and reflecting optical elements are arranged are, however, not required to be clearly defined. In short, the first to third light collecting and reflecting optical elements are arranged so that secondary light-source images of p-polarized light and s-polarized light, included in emitting light from the first and second light sources, are formed at spatially separated positions; so that secondary light-source images of p-polarized light included in emitting light from the first light source and secondary light-source images of p-polarized light included in emitting light from the second light source overlap each other; and so that secondary light-source images of s-polarized light included in emitting light from the first light source and secondary light-source images of s-polarized light included in emitting light from the second light source overlap each other.

In the present invention, the aperture shape of the small light collecting and reflecting elements may be similar to that of the illumination area. Since light from the light source is separated into a plurality of lights by the light collecting and reflecting optical element and is finally superimposed on the illumination area, the adoption of the above-mentioned structure allows light from the light source to be guided to the illumination area without waste.

In the present invention, a light-collecting optical element having a plurality of light-collecting elements may be disposed on the incident or emitting side of the polarization conversion optical element to collect light emitted from the polarized light separating and synthesizing optical element. By thus placing the light-collecting optical element, each of a plurality of lights separated by the light collecting and reflecting optical element can be collected and effectively guided to predetermined positions in the polarization conversion optical element, which improves the polarization conversion efficiency of the polarization conversion optical element. When the first to third light collecting and reflecting optical elements are constituted by different numbers of small light collecting and reflecting elements, the light-collecting optical element is constituted by twice as many light-collecting elements as the light reflecting optical elements used in the light collecting and reflecting optical element which is constituted by the largest number of light reflecting elements.

In the present invention, a superimposing optical element for superimposing light emitted from the polarization conversion optical element onto the illumination area may be disposed on the emitting side of the polarization conversion optical element. By thus placing the superimposing optical element, a plurality of lights separated by the light collecting and reflecting optical element can be effectively guided to the illumination area, which improves the illumination efficiency.

In the present invention, a path-changing optical element for changing the path of light emitted from the polarization conversion optical element may be disposed on the emitting side of the polarization conversion optical element. When the path-changing optical element is placed so that illumination light can emerge in a direction parallel to the plane defined by the optical axes of two light sources having relatively large dimensions, it is possible to reduce the thickness in one direction of the polarized light illumination device, and to thereby achieve a low-profile polarized light illumination device. Therefore, when this polarized light illumination device is used as a light source in a projection display device or the like, it is also possible to achieve a compact projection display device.

In the present invention, the small light collecting and reflecting elements in the first to third light collecting and reflecting optical elements may be formed of a plurality of curved reflecting mirrors. Furthermore, the small light collecting and reflecting elements of the first to third light collecting and reflecting optical elements may be formed of lenses, and reflecting surfaces formed on the opposite side of the polarized light separating and synthesizing optical element of the lenses. Such a structure makes it possible to easily separate light from the light source into a plurality of intermediate beams. When the curved reflecting mirrors are formed of decentering mirrors, or when the lenses are formed of decentering lenses, it is possible to reduce the sizes of the polarization conversion optical element and the light-collecting optical elements mentioned above, and to effectively guide light to the illumination area without using the aforesaid superimposing optical element.

The polarized light illumination device of the present invention may be used in a projection display device that includes an optical modulation element that modulates light emitted from a polarized light illumination device, and a projection optical system that projects the light modulated by the optical modulation element.

The polarized light illumination device of the present invention may also be used in a projection display device capable of displaying a color image, which includes a colored-light separating optical element that separates light emitted from a polarized light illumination device into a plurality of colored lights; a plurality of optical modulation elements that modulate the colored lights separated by the colored-light separating optical element; a colored-light synthesizing optical element that synthesizes the lights modulated by the plurality of optical modulation elements; and a projection optical system that projects the light synthesized by the colored-light synthesizing optical element.

The polarized light illumination device of the present invention may also be used in a projection display device including a reflective-type optical modulation element that modulates light emitted from a polarized light illumination device, a polarized light separating optical element that separates a plurality of polarized light components contained in the light emitted from the polarized light illumination device and the light modulated by the reflective-type optical modulation element, and a projection optical system that projects the light modulated by the reflective-type optical modulation element and emitted via the polarized light separating optical element.

The polarized light illumination device of the present invention may also be used in a projection display device including a colored-light separating optical element that separates light emitted from a polarized light illumination device into a plurality of colored lights; a plurality of reflective-type optical modulation elements that modulate the colored lights separated by the colored-light separating optical element; a plurality of polarized light separating optical elements that separate a plurality of polarized light components contained in the colored lights separated by the colored-light separating optical element and the colored lights modulated by the plurality of reflective-type optical modulation elements; a colored-light synthesizing optical element that synthesizes the lights respectively modulated by the reflective-type optical modulation elements and respectively emitted via the polarized light separating optical elements; and a projection optical system that projects the light synthesized by the colored-light synthesizing optical element.

When the projection display device using the polarized light illumination device of the present invention is constituted in such a manner, it is possible to obtain a projection image that is bright and uniform brightness. Since the polarized light illumination device of the present invention emits beams polarized in the same direction, it is suitable for a projection display device using a liquid crystal element as an optical modulation element.

In the above-mentioned projection display device, it is preferable that at least one of the first and second light sources be detachable. Such a structure permits one of the light sources to be detached when the projection display device is carried, which improves portability.

In the above-mentioned projection display device, it is preferable that at least one of the first and second light sources can be selectively lit. According to this structure, for example, when the projection display device is driven by a battery, the life of the battery can be extended by selectively lighting only one of the light sources. Furthermore, the brightness of a projection image can be appropriately changed according to the environment or the preferences of the viewer by lighting two light sources when a projection image is viewed in an illuminated environment, and by selectively lighting only one of the light sources when a projection image is viewed in a dark environment.

In addition, lights emitted from the first and second light sources in the projection display device may have different spectral characteristics and different brightness characteristics. This structure makes it possible to easily set the hue of illumination light to a predetermined hue.

DETAILED DESCRIPTION OF PREFERRED EMBODIMENTS

The embodiments of the present invention will be described below with reference to the drawings.

In the following description of each of the embodiments and the attached drawings, corresponding parts are denoted by the same numerals and repetition of description thereof is omitted. Three spatial axes, which are orthogonal to one another, are designated the x-axis, the y-axis, and the z-axis. Two directions in parallel with the x-axis are designated the +x direction and the −x direction, two directions in parallel with the y-axis are designated the +y direction and the −y direction, and two directions in parallel with the z-axis are designated the +z direction and the −z direction, respectively.

Figure 1:
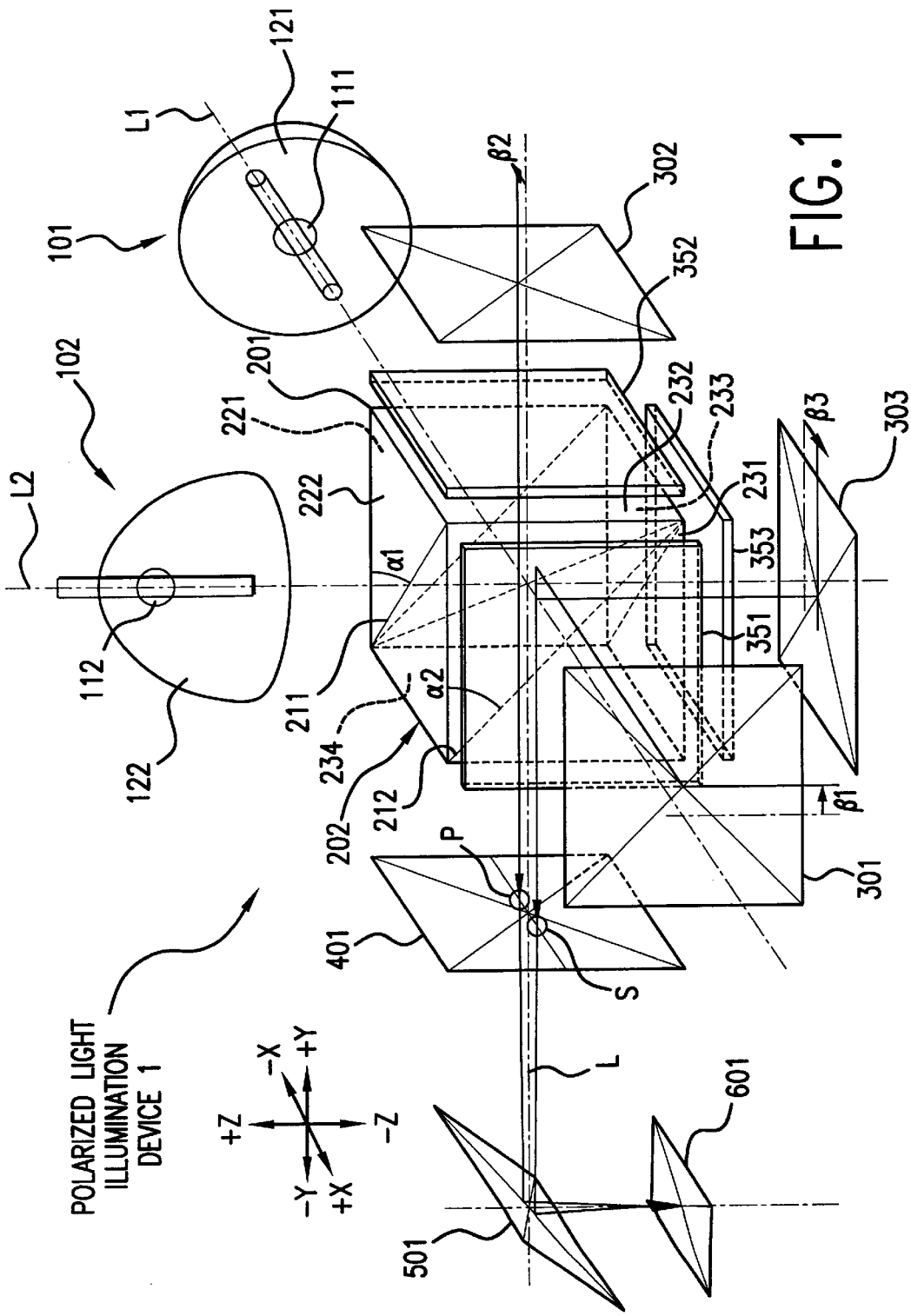
FIG. 1 is a schematic structural view of an optical system constructed in a polarized light illumination device according to a first embodiment of the present invention.

FIG. 1 is a perspective view of a polarized light illumination device according to a first embodiment of the present invention. In this embodiment, there are provided two light sources, a first light source 101 and a second light source 102 that emit light polarized in random directions (hereinafter referred to as "randomly polarized light").

As shown in FIG. 1, a polarized light illumination device 1 of this embodiment consists of, along system optical axes L1 and L intersecting at right angles in the xy plane, the first light source 101, a polarized light separating and synthesizing optical element 201, a first λ/4 phase plate 351 (first polarization-state conversion optical element), a second λ/4 phase plate 352 (second polarization-state conversion optical element), a first light-collecting mirror plate 301 (first light collecting and reflecting optical element), a second light-collecting mirror plate 302 (second light collecting and reflecting optical element), a light-collecting lens section 401 (light-collecting optical element, polarization conversion optical element, superimposing optical element), and a reflecting mirror 501 (path-changing optical element). Randomly polarized light emitted from the first light source 101 is, as will be described later, separated into two types of polarized light by the polarized light separating and synthesizing optical element 201, is synthesized again into one type of polarized light by the first λ/4 phase plate 351, the first light-collecting mirror plate 301, the second λ/4 phase plate 352, the second light-collecting mirror plate 302, the polarized light separating and synthesizing optical element 201, and the light-collecting lens section 401, and then, reaches a rectangular illumination area 601 via the reflecting mirror 501.

Arranged along system optical axes L2 and L, intersecting at right angles in the yz plane, are the second light source 102, the polarized light separating and synthesizing optical element 201, a third λ/4 phase plate 353 (third polarization-state conversion optical element), the second λ/4 phase plate 352, a third light-collecting mirror plate 303 (third light collecting and reflecting optical element), the second light-collecting mirror plate 302, the light-collecting lens section 401, and the reflecting mirror 501. Randomly polarized light emitted from the second light source 102 is, as will be described later, separated into two types of polarized light by the polarized light separating and synthesizing optical element 201, is synthesized again into one type of polarized light by the third λ/4 phase plate 353, the third light-collecting mirror plate 303, the second λ/4 phase plate 352, the second light-collecting mirror plate 302, the polarized light separating and synthesizing optical element 201, and the light-collecting lens section 401, and similarly reaches the rectangular illumination area 601 via the reflecting mirror 501. The direction of emission of the illumination light, which is caused by the reflecting mirror 501 to change its direction of travel through an angle of about 90°, is nearly in parallel with the plane including the first and second light sources 101 and 102.

The first and second light sources 101 and 102 generally include light-source lamps 111 and 112, and parabolic reflectors 121 and 122, respectively. Randomly polarized light radiated from the light-source lamps 111 and 112 is reflected in one direction by the parabolic reflectors 121 and 122, is converted into a nearly parallel beam, and enters the polarized light separating and synthesizing optical element 201. Instead of the parabolic reflectors 121 and 122, elliptical reflectors, spherical reflectors, and the like may be used.

The polarized light separating and synthesizing optical element 201 is a polarizing beam splitter having nearly the shape of a hexahedron, in which first and second polarization separating films 211 and 212 formed of dielectric multilayer films are built in a prism 202 made of glass. The first polarization separating film 211 is placed at an angle with respect to emitting light from the first light source 101 so that it forms an angle α1=45° with respect to a first surface 221 of the polarized light separating and synthesizing optical element 201. The second polarized light separating film 212 is placed at an angle with respect to emitting light from the second light source 102 so that it forms an angle α2=45° with respect to a second surface 222 of the polarized light separating and synthesizing optical element 201.

Figure 2:
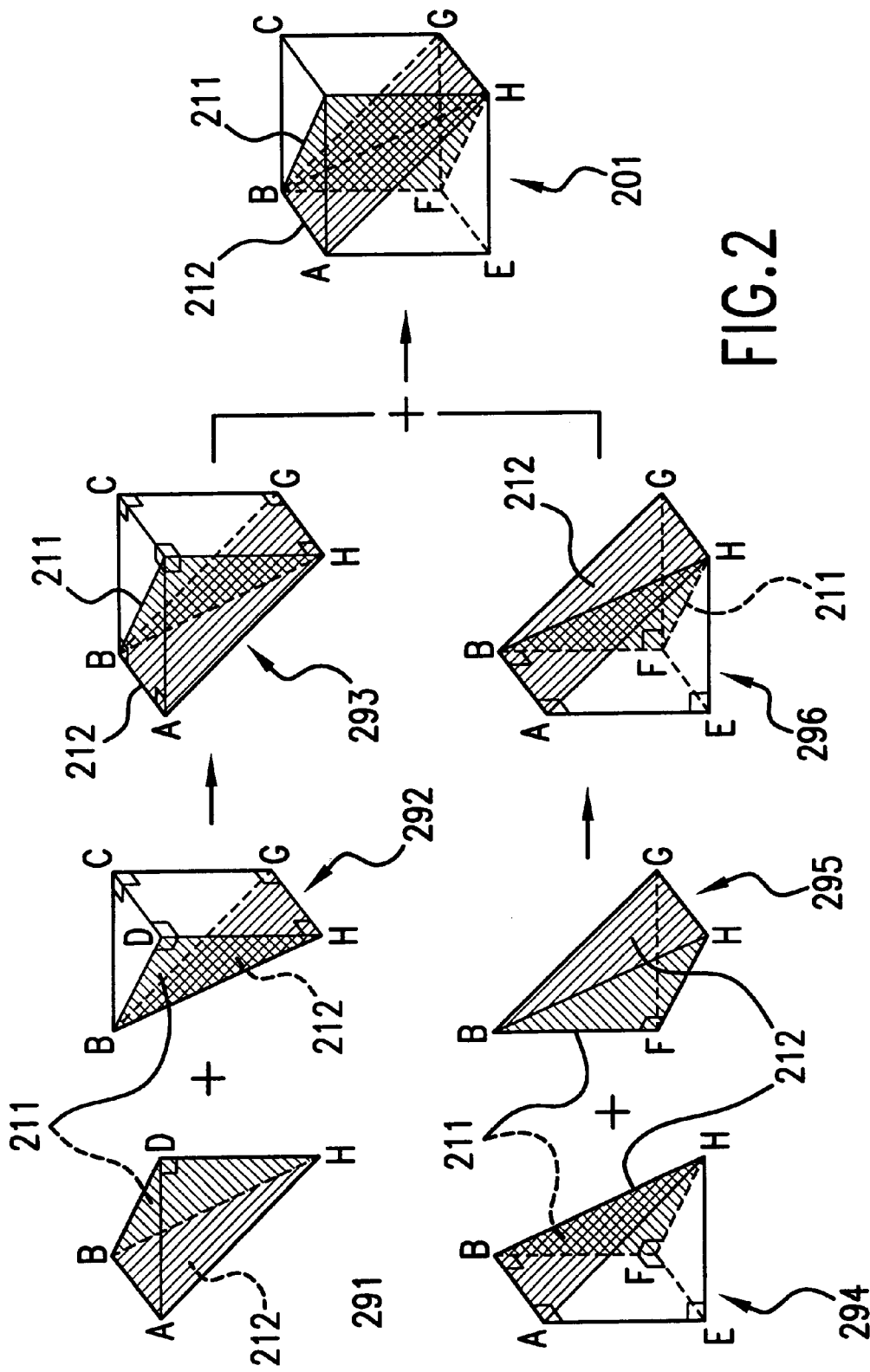
FIG. 2 is an explanatory view showing a detailed structure of a polarized light separating and synthesizing optical element.

FIG. 2 is a detailed structural view of the polarized light separating and synthesizing optical element 201. As shown in FIG. 2, the polarized light separating and synthesizing optical element 201 consists of two triangular-pyramid prisms 291 and 295, and two quadrangular-pyramid prisms 292 and 294.

The first polarization separating films 211 are formed between a side face BDH of the first triangular-pyramid prism 291 and a side face BDH of the first quadrangular-pyramid prism 292, and between a side face BFH of the second quadrangular-pyramid prism 294 and a side face BFH of the second triangular-pyramid prism 295. This first polarization separating film 211 is formed by, for example, evaporating dielectric multilayer films on one of the side face BDH of the first triangular-pyramid prism 291 and the side face BDH of the first quadrangular-pyramid prism 292, and on one of the side face BFH of the second quadrangular-pyramid prism 294 and the side face BFH of the second triangular-pyramid prism 295. The first polarization separating film 211 may be formed on any of the side face BDH of the first triangular-pyramid prism 291 and the side face BDH of the first quadrangular-pyramid prism 292, and on any of the side face BFH of the second triangular-pyramid prism 294 and the side face BFH of the second quadrangular-pyramid prism 295. Since the first polarization separating film 211 to be formed on two prisms is required to be flat, it is preferable that the first polarization separating film 211 be formed on the side face BDH of the first triangular-pyramid prism 291 and the side face BFH of the second quadrangular-pyramid prism 294, or on the side face BDH of the first quadrangular-pyramid prism 292 and the side face BFH of the second triangular-pyramid prism 295.

On the other hand, the second polarization separating film 212 is formed between a side face ABH of the first triangular-pyramid prism 291 and a side face ABH of the second quadrangular-pyramid prism 294 and between a side face BGH of the first quadrangular-pyramid prism 292 and a side face BGH of the second triangular-pyramid prism 295. The second polarization separating film 212 is formed by evaporating dielectric multilayer films on one of the side face ABH of the first triangular-pyramid prism 291 and the side face ABH of the second quadrangular-pyramid prism 294, and on one of the side face BGH of the first quadrangular-pyramid prism 292 and the side face BGH of the second triangular-pyramid prism 295. The second polarization separating film 212 may be formed on any of the side face ABH of the first triangular-pyramid prism 291 and the side face ABH of the second quadrangular-pyramid prism 294, and on any of the side face BGH of the first quadrangular-pyramid prism 292 and the side face BGH of the second triangular-pyramid prism 295. Since the second polarization separating film 212 to be formed on two prisms is required to be flat, it is preferable that the second polarization separating film 212 be formed on the side face ABH of the first triangular-pyramid prism 291 and the side face BGH of the first quadrangular-pyramid prism 294, or on the side face ABH of the second quadrangular-pyramid prism 294 and the side face BGH of the second triangular-pyramid prism 295.

The side faces BDH of the first triangular-pyramid prism 291 and the first quadrangular-pyramid prism 292, where the first polarization separating film 211 is formed, are bonded to each other, thereby forming a first prism assembly 293. The side faces BFH of the second quadrangular-pyramid prism 294 and the second triangular-pyramid prism 295, where the polarization separating film 211 is formed, are bonded to each other, thereby forming a second prism assembly 296. Finally, side faces ABGH of the two prism assemblies 293 and 296, where the second polarization separating film 212 is formed, are bonded to each other, whereby the polarized light separating and synthesizing optical element 201 is completed. Of course, the abovementioned order in which four prisms are assembled is just an example, and the order is not limited to the above one.

A further description will be given with reference to FIG. 1. The first $\lambda/4$ phase plate 351 is disposed so as to face a third surface 231 of the polarized light separating and synthesizing optical clement 201, and the first light-collecting mirror plate 301 is disposed outside the phase plate. In this embodiment, the first $\lambda/4$ phase plate 351 and the first light-collecting mirror plate 301 are arranged nearly in parallel with the third surface 231. The second $\lambda/4$ phase plate 352 is disposed so as to face a fourth surface 232 of the polarized light separating and synthesizing optical element 201, and the second light-collecting mirror plate 302 is disposed outside the phase plate. In this embodiment, the second $\lambda/4$ phase plate 352 and the second light-collecting mirror plate 302 are arranged nearly in parallel with the fourth surface 232. The third $\lambda/4$ phase plate 353 is disposed so as to face a fifth surface 233 of the polarized light separating and synthesizing optical element 201, and the third light-collecting mirror plate 303 is disposed outside the phase plate. In this embodiment, the third $\lambda/4$ phase plate 353 and the third light-collecting mirror plate 303 are arranged nearly in parallel with the fifth surface 233. A detailed structure of the first to third light-collecting mirror plates 301, 302, and 303 will be described later. Although the first to third $\lambda/4$ phase plates 351, 352, and 353 shown in FIG. 1 are, prior to plain view, apart from the polarized light separating and synthesizing optical element 201, it is preferable that they be disposed in close contact with the polarized light separating and synthesizing optical element 201.

On the side of a sixth surface 234 of the polarized light separating and synthesizing optical element 201, the light-collecting lens section 401, which will be described in detail later, composed of a light-collecting lens plate 411, a $\lambda/2$ phase plate 421 (polarization conversion optical element), and a superimposing lens 431 (superimposing optical element), is disposed perpendicular to the system optical axis L.

Figure 3:
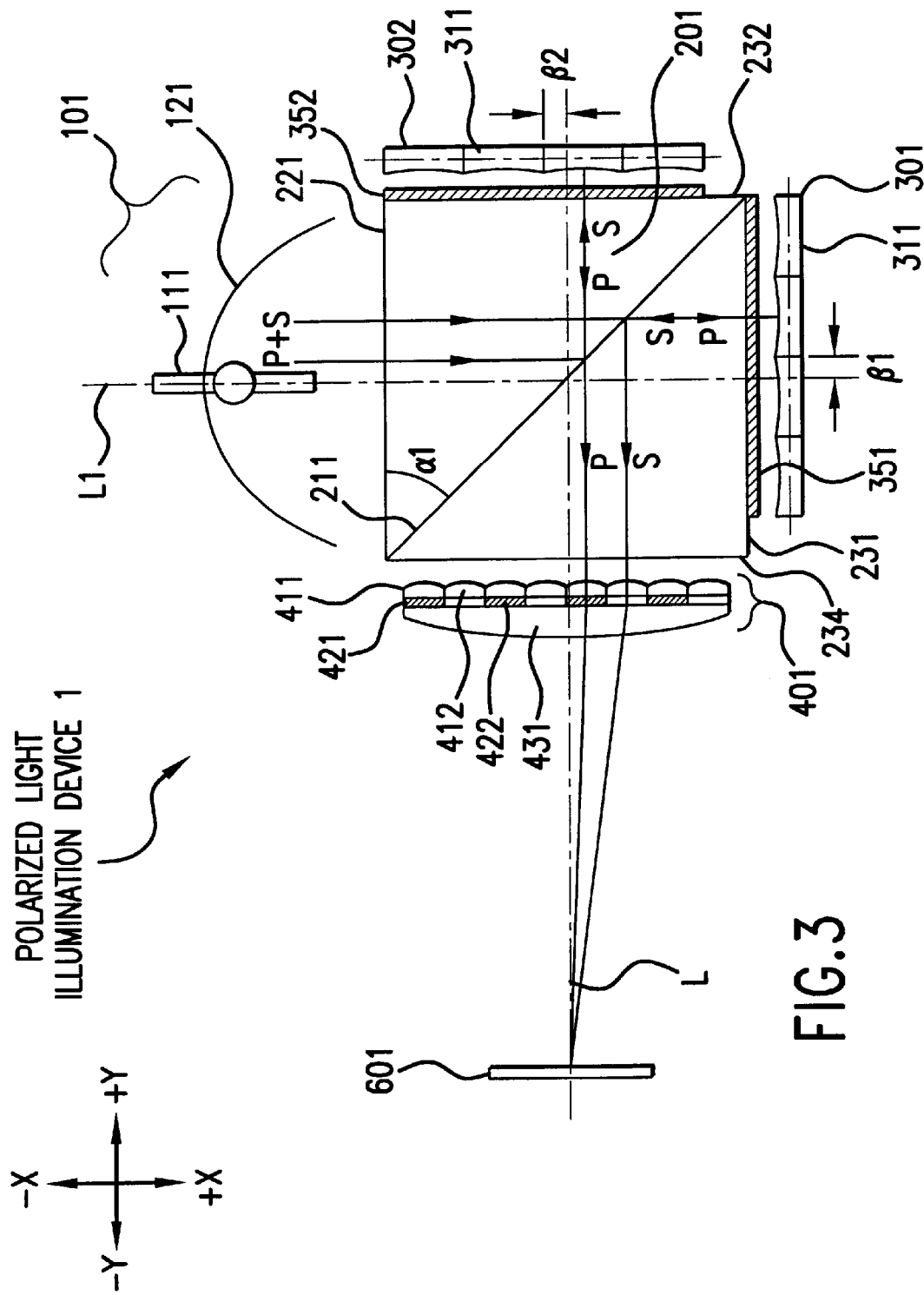
FIG. 3 is a schematic structural view showing the basic structure of the optical system constructed in the polarized light illumination device according to the first embodiment of the present invention.

Description will be given of the processes in which randomly polarized light emitted from the first light source 101 is separated into two types of polarized light according to the direction of polarization, in the polarized light illumination device 1 having the structure mentioned above. FIG. 3 is a cross-sectional view taken along the xy plane shown in FIG. 1. The reflecting mirror 501 is omitted, because it is not directly related to the description of the processes. Therefore, the optical path from the light-collecting lens section 401 to the illumination area 601 is shown as a straight line. This also applies to FIGS. 9 and 10 that will be described later.

Randomly polarized light emitted from the first light source 101 can be regarded as combination light of p-polarized light and s-polarized light. The combination light, which is emitted from the first light source 101 and enters the first surface 221 of the polarized light separating and synthesizing optical element 201, is separated into two types of polarized light, p-polarized light and s-polarized light, by the first polarization separating film 211. That is, p-polarized light included in the randomly polarized light passes unchanged through the first polarization separating film 211 and travels toward the third surface 231, while s-polarized light is reflected by the first polarization separating film 211, and changes its direction of travel toward the fourth surface 232 of the polarized light separating and synthesizing optical element 201.

The two types of polarized lights separated by the polarized light separating and synthesizing optical element 201 pass through the first and second $\lambda/4$ phase plate 351 and 352, and are reflected by the first and second light-collecting mirror plates 301 and 302, respectively.

Figure 4:
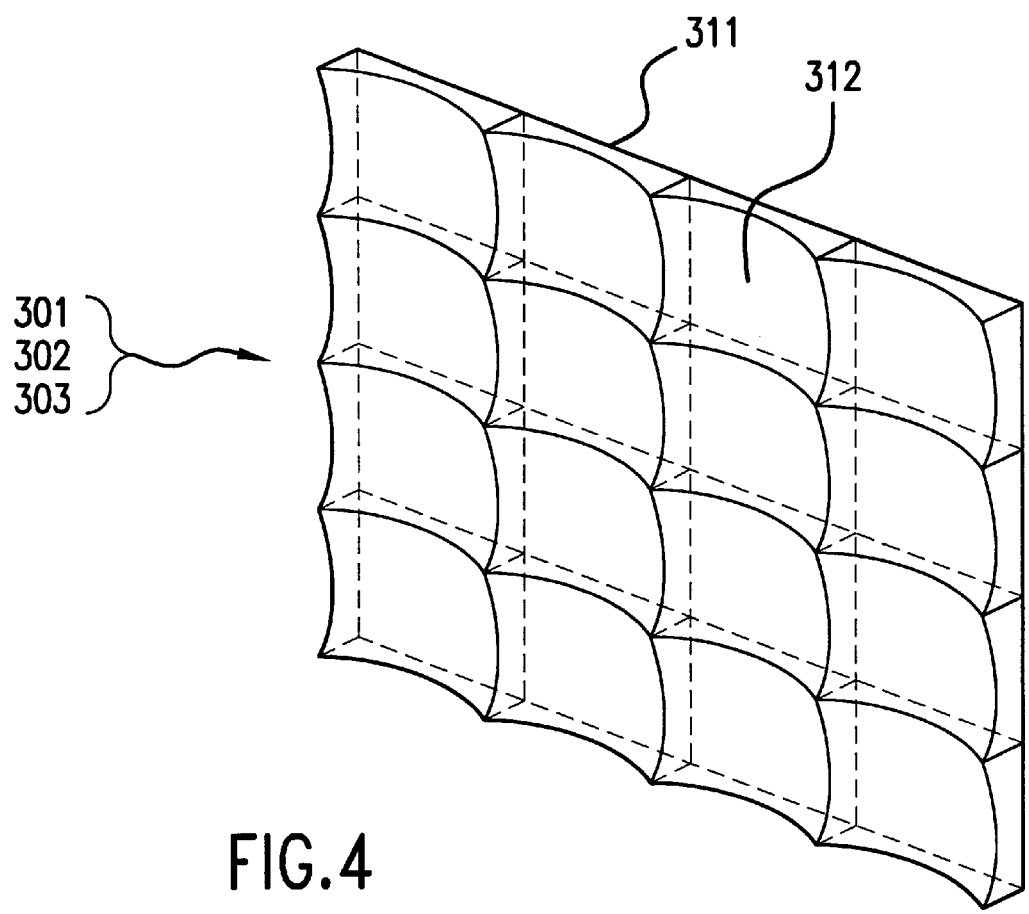
FIG. 4 is a perspective view of a light-collecting mirror plate in the polarized light illumination device shown in FIG. 1.

As shown in FIG. 4 showing the outer appearance, these light-collecting mirror plates 301 and 302 are formed by arranging in a matrix a plurality of small light-collecting mirrors 311, each having a rectangular outer shape that is almost similar to that of the illumination area 601, and forming reflecting surfaces 312 by aluminum-evaporated films, dielectric multilayer films, and the like, on the surfaces of the small light-collecting mirrors 311. In this embodiment, the reflecting surfaces 312 of the small light-collecting mirrors 311 are formed in a spherical shape. The curved form of the reflecting surfaces 312 may be parabolic, spherical, or toric, and it can be set according to the properties of incident light from the first and second light sources 101 and 102. This also applies to the third light-collecting mirror plate 303 that will be described later.

Figure 5:
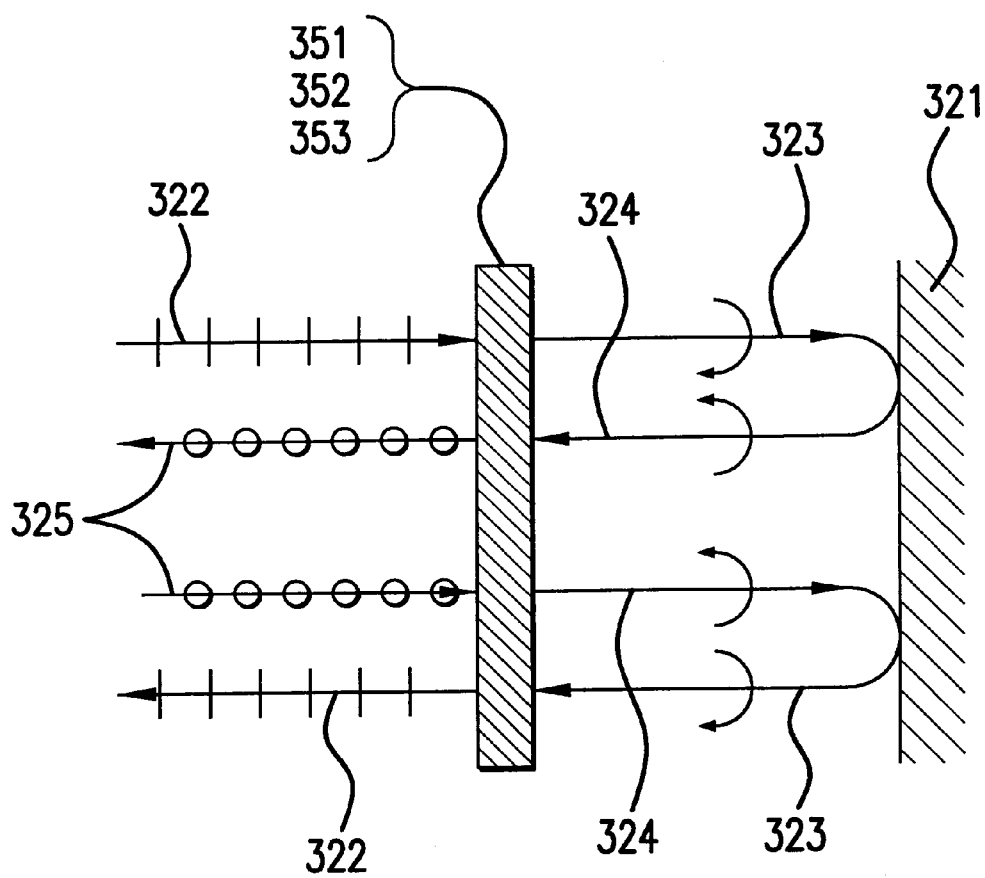
FIG. 5 is an explanatory view showing a polarizing operation performed in the polarized light illumination device shown in FIG. 1.

P-polarized light and s-polarized light separated by the first polarization separating film 211 respectively pass through the first and second λ/4 phase plates 351 and 352, are reflected by the first and second light-collecting mirror plates 301 and 302, and pass again through the λ/4 phase plates 351 and 352, while the directions of travel thereof are reversed by about 180°, and simultaneously, the direction of polarization is changed by 90°. The change of the polarized light will be described with reference to FIG. 5. In this figure, the light-collecting mirror plate 301 or 302 is shown as a flat mirror plate 321 for brief explanation. P-polarized light 322 that is incident on the λ/4 phase plate 351 or 352 is converted by the λ/4 phase plate into right-handed circularly polarized light 323 (into left-handed circularly polarized light depending on the way the λ/4 phase plate is arranged), and reaches the mirror plate 321. The light is reflected by the mirror plate 321, and simultaneously, the turning direction of the polarization plane is changed. That is, right-handed circularly polarized light 323 changes to left-handed circularly polarized light 324 (left-handed circularly polarized light changes to right-handed circularly polarized light). The polarized light, whose direction of travel is reversed by about 180° by the mirror plate 321 and which is converted into left-handed circularly polarized light 325, passes again through the λ/4 phase plate 351 or 352, where it is converted into s-polarized light 325. Through similar processes, s-polarized light 325 is converted into p-polarized light 322.

A further description will be given with reference to FIG. 3. The p-polarized light that reaches the third surface 231 is caused by the first λ/4 phase plate 351 and the first light-collecting mirror plate 301 to reverse its direction of travel by about 180°, and simultaneously, is converted into s-polarized light. The s-polarized light is reflected by the first polarization separating film 211 so that its direction of travel is changed, and travels toward the sixth surface 234. On the other hand, the s-polarized light that reaches the fourth surface 232 is caused by the second λ/4 phase plate 352 and the second light-collecting mirror plate 302 to reverse its direction of travel by about 180°, and simultaneously, is converted into p-polarized light. The p-polarized light passes unchanged through the first polarization separating film 211, and travels toward the sixth surface 234. Since the first polarization separating film 211 also functions as a polarized light synthesizing film, the polarized light separating and synthesizing optical element 201 functions as a polarized light separating and synthesizing optical element.

Since the first and second light-collecting mirror plates 301 and 302 are composed of the small light-collecting mirrors 311 having a light-collecting function, they approximately reverse the direction of travel of polarized light, and form the same number of focal images as that of the small light-collecting mirrors 311 that constitute the light-collecting mirror plates 301 and 302. These focal images are none other than light-source images, and therefore, they are referred to as secondary light-source images hereinafter.

Figure 6:
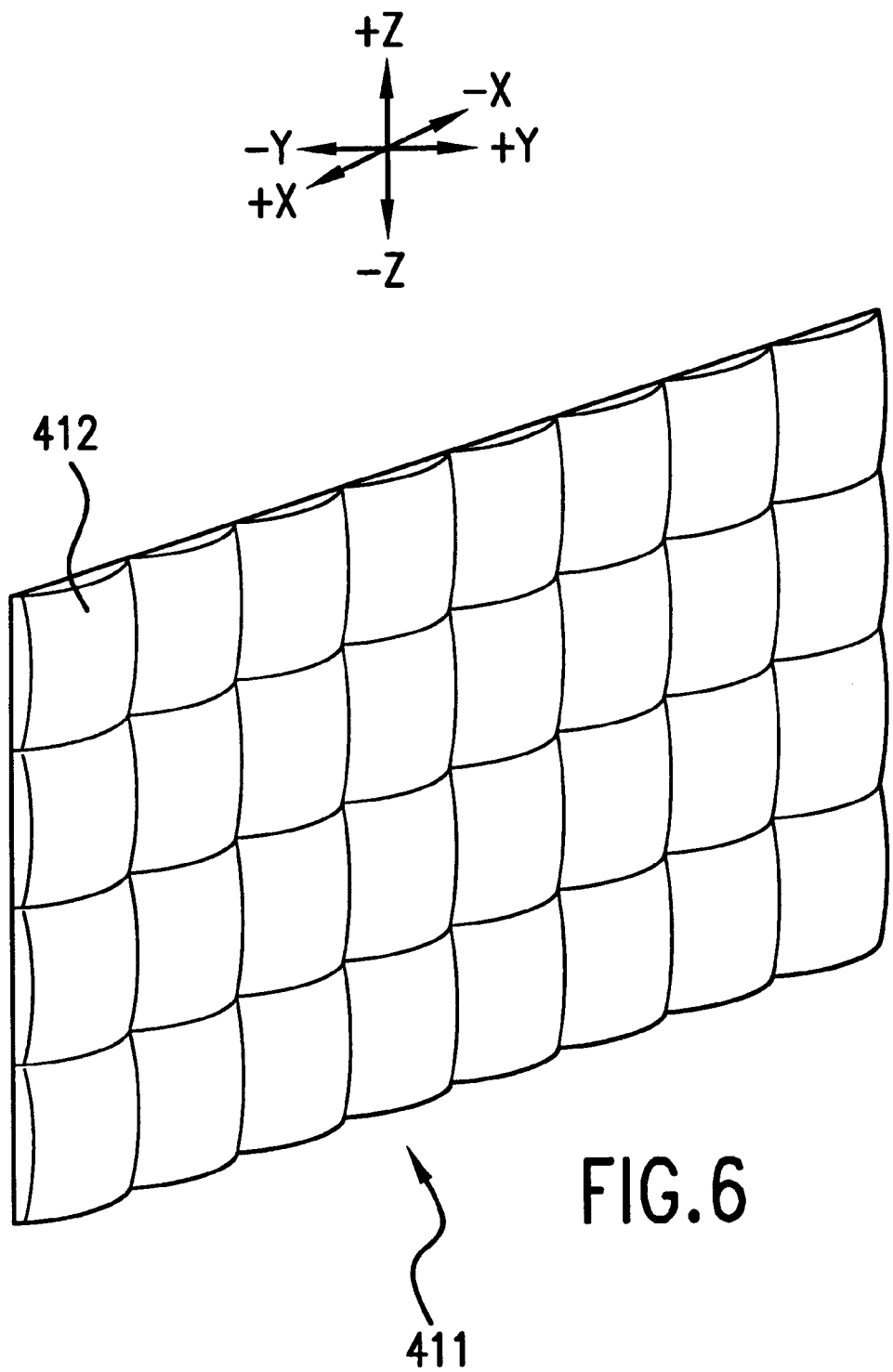
FIG. 6 is a perspective view of a lens plate in the polarized light illumination device shown in FIG. 1.

The light-collecting lens plate 411 is a compound lens member composed of rectangular small lenses 412, as shown in FIG. 6, which shows the outer appearance, and there are twice as many small lenses 412 as the small light-collecting mirrors 311 constituting the first to third light-collecting mirror plates 301, 302, and 303. When the first to third light-collecting mirror plates 301, 302, and 303 are composed of different numbers of small light-collecting mirrors 311, the light-collecting lens plate 411 is composed of twice as many small lenses 412 as the number of small light-collecting mirrors that constitute the light-collecting mirror plate which has the largest number of small light-collecting mirrors 311.

The first light-collecting mirror plate 301 is disposed so that about the center thereof is shifted by β1 from the x-axis in the +y direction. The second light-collecting mirror plate 302 is disposed so that about the center thereof is shifted by β2 from the y-axis in the −x direction.

Figure 7:
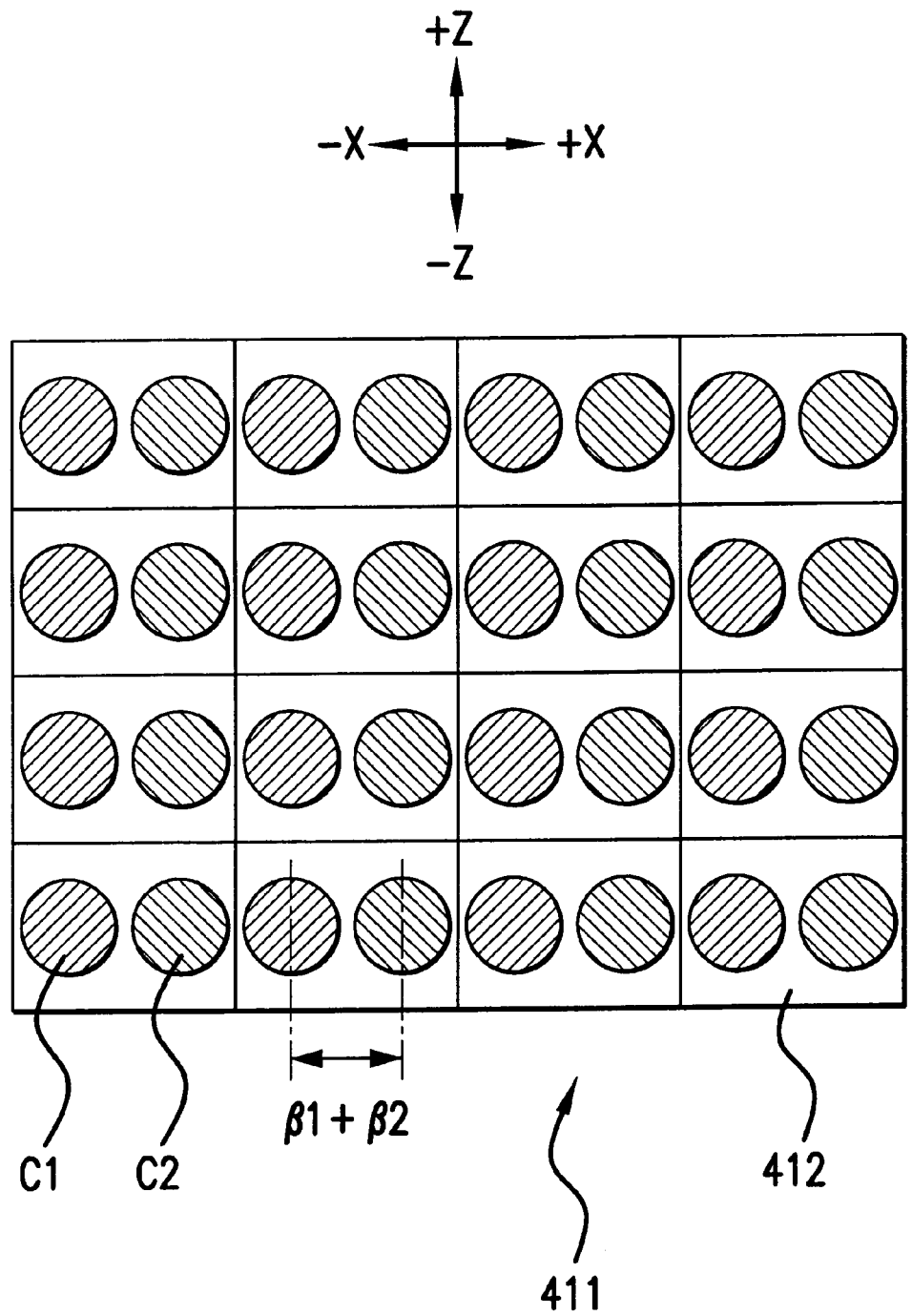
FIG. 7 is an explanatory view showing the positions of secondary light-source images formed in the light-collecting lens plate of the polarized light illumination device shown in FIG. 1.

Since the light-collecting mirror plates are shifted from the x-axis or the y-axis, as mentioned above, the principal ray of s-polarized light, which is reflected by the small light-collecting mirror 311 in the first light-collecting mirror plate 301 and enters the light-collecting lens section 401, and the principal ray of p-polarized light, which is reflected by the small light-collecting mirror 311 in the second light-collecting mirror plate 302 and enters the light-collecting lens section 401, are in parallel with each other, and do not overlap. That is, a secondary light-source image of s-polarized light that is formed by the first light-collecting mirror plate 301 and a secondary light-source image of p-polarized light that is formed by the second light-collecting mirror plate 302 are formed at slightly different positions in the x-axis direction. In this embodiment, the arrangement spacing between secondary light-source images of p-polarized light and secondary light-source image of s-polarized light is equal to β1+β2. FIG. 7 shows secondary light-source images formed by two types of polarized light when the light-collecting lens plate 411 is viewed from the side of the illumination area 601. Two types of secondary light-source images, secondary light-source images C1 formed by p-polarized light (areas of circular images that are shaded by oblique lines slanting up to the right) and secondary light-source images C2 formed by s-polarized light (areas of circular images that are shaded by oblique lines slanting up to the left) are arranged at intervals of β1+β2 in the x-axis direction. Formed on the surface of the light-collecting lens plate 411 on the side of the illumination area 601 is the λ/2 phase plate 421 having phase layers 422 that are selectively formed corresponding to the positions of the secondary light-source images C1 of p-polarized light. Therefore, p-polarized light is subjected to a rotatory polarization action when passing through the phase layers 422, and is converted into s-polarized light. On the other hand, since s-polarized light does not pass through the phase layers 422, it passes unchanged through the λ/2 phase plate 421 without being subjected to the turning action of the polarization plane. For this reason, most light emerging from the light-collecting lens section 401 is aligned into s-polarized light.

The light thus aligned into s-polarized light is superimposed on one point in the illumination area 601 by the superimposing lens 431 disposed on the surface of the λ/2 phase plate 421 that is on the side of the illumination area 601. In this case, although not shown in FIG. 3, illumination light reaches the illumination area 601 after it is caused by the reflecting mirror 501, interposed between the superimposing lens 431 and the illumination area 601, to bend its direction of travel through about 90°, as shown in FIG. 1. That is, a plurality of image planes, which are cut out by the small light-collecting mirrors 311 in the first and second light-collecting mirror plates 301 and 302, are superimposed at one point by the light-collecting lens plate 411 and the superimposing lens 431, and are converted into one type of polarized light when passing through the λ/2 phase plate 421, whereby almost all light reaches the illumination area 601. Therefore, the illumination area 601 is illuminated with about one type of polarized light. Simultaneously, since the illumination area 601 is illuminated with a plurality of secondary light-source images, there are considerably small variations in illumination intensity, and the illumination area 601 is uniformly illuminated.

A description will be given again with reference to FIG. 1. Through the processes that are in principle similar to those of randomly polarized light emitted from the first light source 101, randomly polarized light emitted from the second light source 102 is also collected at the positions, which are slightly different according to the polarization direction, by the polarized light separating and synthesizing optical element 201, the second and third light-collecting mirror plates 302 and 303, the second and third λ/4 phase plates 352 and 353, and the like. After that, the light is converted into one type of polarized light by the light-collecting lens section 401, thereby uniformly illuminating one point in the illumination area 601.

Namely, p-polarized light of randomly polarized light emitted from the second light source 102 passes unchanged through the second polarization separating film 212 in the polarized light separating and synthesizing optical element 201, and travels toward the fifth surface 233, while s-polarized light is reflected by the second polarization separating film 212, and changes its direction of travel toward the fourth surface 232. The p-polarized light and the s-polarized light thus separated pass though the third and second λ/4 phase plates 353 and 352, are reflected by the third and second light-collecting mirror plates 303 and 302, and pass again through the λ/4 phase plates 353 and 352, respectively. Therefore, the p-polarized light that reaches the fifth surface 233 is caused by the third λ/4 phase plate 353 and the third light-collecting mirror plate 303 to reverse the direction of travel by about 180°, is simultaneously converted into s-polarized light, is reflected by the second polarization separating film 212 so as to change the direction of travel, and travels toward the sixth surface 234. On the other hand, the s-polarized light that reaches the fourth surface 232 is caused by the second λ/4 phase plate 352 and the second light-collecting mirror plate 302 to reverse its direction of travel by about 180°, and simultaneously, is converted into p-polarized light. Then, the p-polarized light passes unchanged through the second polarization separating film 212, and travels toward the sixth surface 234.

The third light-collecting mirror plate 303 is also composed of small light-collecting mirrors 311 having a light-collecting function, similar to the first and second light-collecting mirror plates 301 and 302, and is disposed so that about the center thereof is shifted by β3 from the z-axis in the +x direction. Therefore, the principal ray of p-polarized light, which is reflected by the small light-collecting mirror 311 in the second light-collecting mirror plate 302 and enters the light-collecting lens section 401, and the principal ray of s-polarized light, which is reflected by the small light-collecting mirror 311 in the third light-collecting mirror plate 303 and enters the light-collecting lens section 401, are in parallel with each other, and do not overlap. That is, secondary light-source images of p-polarized light that are formed by the second light-collecting mirror plate 302 and secondary light-source images of s-polarized light that are formed by the third light-collecting mirror plate 303 are formed at slightly different positions. These two types of secondary light-source images formed in this case (secondary light-source images of p-polarized light and secondary light-source images of s-polarized light) overlap with two types of secondary light-source images formed by light emitted from the first light source 101 so that the directions of polarization are the same. That is, secondary light-source images of p-polarized light that is included in emitting light from the first light source 101 and secondary light-source images of p-polarized light that is included in emitting light from the second light source 102 are formed at the same positions so that they overlap each other. For this purpose, the amount β3 of shift of the third light-collecting mirror plate is set to be equal to β1. According to the above, emitting light from the second light source 102 is also aligned into s-polarized light in a manner similar to emitting light from the first light source 101. As a result, emitting light from the first and second light sources 101 and 102 is synthesized into s-polarized light, and reaches the illumination area 601 via the reflecting mirror 501.

As mentioned above, according to the polarized light illumination device 1 of this embodiment, randomly polarized light emitted from the first and second light sources 101 and 102 is separated into two types of polarized light by the polarized light separating and synthesizing optical element 201, and is guided to predetermined areas of the λ/2 phase plate 421, where p-polarized light is converted into s-polarized light. Therefore, randomly polarized light emitted from the first and second light sources 101 and 102 can be synthesized after most of the light is aligned into s-polarized light, without causing any loss, which makes it possible to brightly illuminate the illumination area 601. Moreover, although the two light sources 101 and 102 are used, since it is possible to synthesize illumination light from the two light sources 101 and 102 without increasing the incident angle (illumination angle) of the illumination light with respect to the illumination area, the cross-sectional area of the illumination light is the same as that in the case where a single light source is used. Therefore, the amount of light per given area can be double that in the case where a single light source is used. Both the two light sources consisting of the first and second light sources 101 and 102 can be placed in the xz plane. In this case, since the reflecting mirror 501 is disposed to change the direction of travel of illumination light emitted from the light-collecting lens section 401, the direction of emission of the illumination light can be in parallel with the xz plane where the two light sources are arranged. Therefore, the polarized light illumination device of this embodiment is suitable for in reduced thickness and low height. In short, the reflecting mirror 501 placed behind the light-collecting lens section 401 provides an increased degree of freedom in design for size reduction of the polarized light illumination device.

In order to guide two types of polarized light to predetermined areas of the λ/2 phase plate 421, the polarized light separating and synthesizing optical element 201 needs to have a high polarized light separating ability. In this embodiment, since the polarized light separating and synthesizing optical element 201 is constituted by a prism of glass, and dielectric multilayer films made of an inorganic material, the polarized light separating ability of the polarized light separating and synthesizing optical element 201 is thermally stable. For this reason, an always stable polarized light separating ability can be provided in an illumination device that is required to produce high light-output, which makes it possible to achieve a polarized light device having satisfactory performance.

In this embodiment, in accordance with the rectangular shape of the illumination area 601, the small light-collecting mirrors 311 in the first to third light-collecting mirror plates 301, 302, and 303 are formed in a rectangular shape that is long from side to side (almost similar to the shape of the illumination area), and simultaneously, the direction of separation of the two types of polarized light emerging from the polarized light separating and synthesizing optical element 201 (the direction in which secondary light-source images formed by the two types of polarized light are arranged) is set to a lateral direction (x direction) in accordance with the shape of the illumination area 601. For this reason, when the illumination area 601 having a rectangular shape that is long from side to side is formed, the illumination efficiency can be enhanced without any loss in the amount of light.

The fact that the principal ray of s-polarized light, which is reflected by the small light collecting and reflecting elements in the first light-collecting mirror plate 301 and the third light-collecting mirror plate 303 and enters the light-collecting lens section 401, and the principal ray of p-polarized light, which is reflected by the small light collecting and reflecting elements in the second light collecting and reflecting optical element and enters the light-collecting lens section 401, are in parallel with each other means that light reflected by the small light collecting and reflecting elements in the first to third light correcting and reflecting elements enters the polarized light separating and synthesizing optical element 201 at almost the same angle. Therefore, even when the polarized light separating and synthesizing properties of the polarized light separating and synthesizing optical element 201 are apt to depend on the incident angle of light, polarized light separation and synthesis can be stably performed, whereby nearly uniform illumination light can be obtained.

The amounts $\beta 1$, $\beta 2$, and $\beta 3$ and directions of shift of the first to third light-collecting mirror plates 301, 302, and 303 from the x, y, and z axes, which have been mentioned in this embodiment, are not limited to those in the embodiment. In short, the amounts $\beta 1$, $\beta 2$, and $\beta 3$ and directions of shift of the first to third light-collecting mirror plates 301, 302, and 303 are set so that secondary light-source images of p-polarized light and s-polarized light included in emitting light from the first and second light sources 101 and 102 are formed at spatially separated positions, so that secondary light-source images of p-polarized light included in emitting light from the first light source 101 and secondary light-source images of p-polarized light included in emitting light from the second light source 102 overlap each other, and so that secondary light-source images of s-polarized light included in emitting light from the first light source 101 and secondary light-source images of s-polarized light included in emitting light from the second light source 102 overlap each other.

Therefore, it is not always necessary to shift all the first to third light-collecting mirror plates in parallel from the corresponding axes (x-axis, y-axis, and z-axis). For example, it may be possible to shift only the second light-collecting mirror plate 302 in parallel without shifting the first and third light-collecting mirror plates 301 and 303 in parallel so that the x-axis or the z-axis passes through about the centers of the light-collecting mirror plates. Conversely, it may be possible to shift only the first and third light-collecting mirror plate 301 and 303 in parallel without shifting the second light-collecting mirror plate 302 in parallel so that the y-axis passes through about the center of the second light-collecting mirror plate 302. In some cases, there is a need to similarly shift the light-collecting lens section 401 from the y-axis, depending on the amount and direction of shift of the first to third light-collecting mirror plates.

While the $\lambda/2$ phase plate 421 is disposed on the side of the light-collecting lens plate 411 closer to the illumination area in this embodiment, it may be disposed at other positions near the positions where secondary light-source images are formed. For example, the $\lambda/2$ phase plate 421 may be disposed on the side of the light-collecting lens plate 411 closer to the light source.

When the small lenses 412 that constitute the light-collecting lens plate 411 are formed of decentering lenses, light emerging from each of the small lenses 412 can be directed toward the illumination area 601, whereby the light-collecting lens plate 411 also serves the function of the superimposing lens 431. When the small light-collecting mirrors 311 that constitute the first to third light-collecting mirror plates 301, 302, and 303 are formed of decentering mirrors, light emerging from the small light-collecting mirrors 311 can be directed toward the illumination area 601, whereby the first to third light-collecting mirror plates 301, 302, and 303 also similarly serve the function of the superimposing lens 431. Since the superimposing lens 431 can be omitted in these cases, it is possible to reduce the cost of the polarized light illumination device. In the latter case, the spacing, shown in FIG. 7, between secondary light-source images formed by p-polarized light and secondary light-source images formed by s-polarized light is smaller than $\beta 1 + \beta 2$.

When light emitted from the first and second light sources 101 and 102 offers high parallelism, the light-collecting lens plate 411 may be omitted.

While the small lenses 412 constituting the light-collecting lens plate 411 are formed of rectangular lenses that are long from side to side, there are no specific limitations on the shape thereof. Since secondary light-source images C1 formed by p-polarized light and secondary light-source images C2 formed by s-polarized light are arranged in the lateral direction, as shown in FIG. 7, it is preferable to determine the shape of the small lenses 412 constituting the light-collecting lens plate 411, according to the positions where the secondary light-source images are formed.

Two types of phase layers having different characteristics may be placed at the positions where secondary light-source images are formed by p-polarized light and the positions where secondary light-source images are formed by s-polarized light, respectively, such as to align light into one type of polarized light that is polarized in one specific direction. Further, the phase layers 422 may be placed at the positions where secondary light-source images C2 are formed by s-polarized light such as to make illumination light into p-polarized light.

Figure 8:
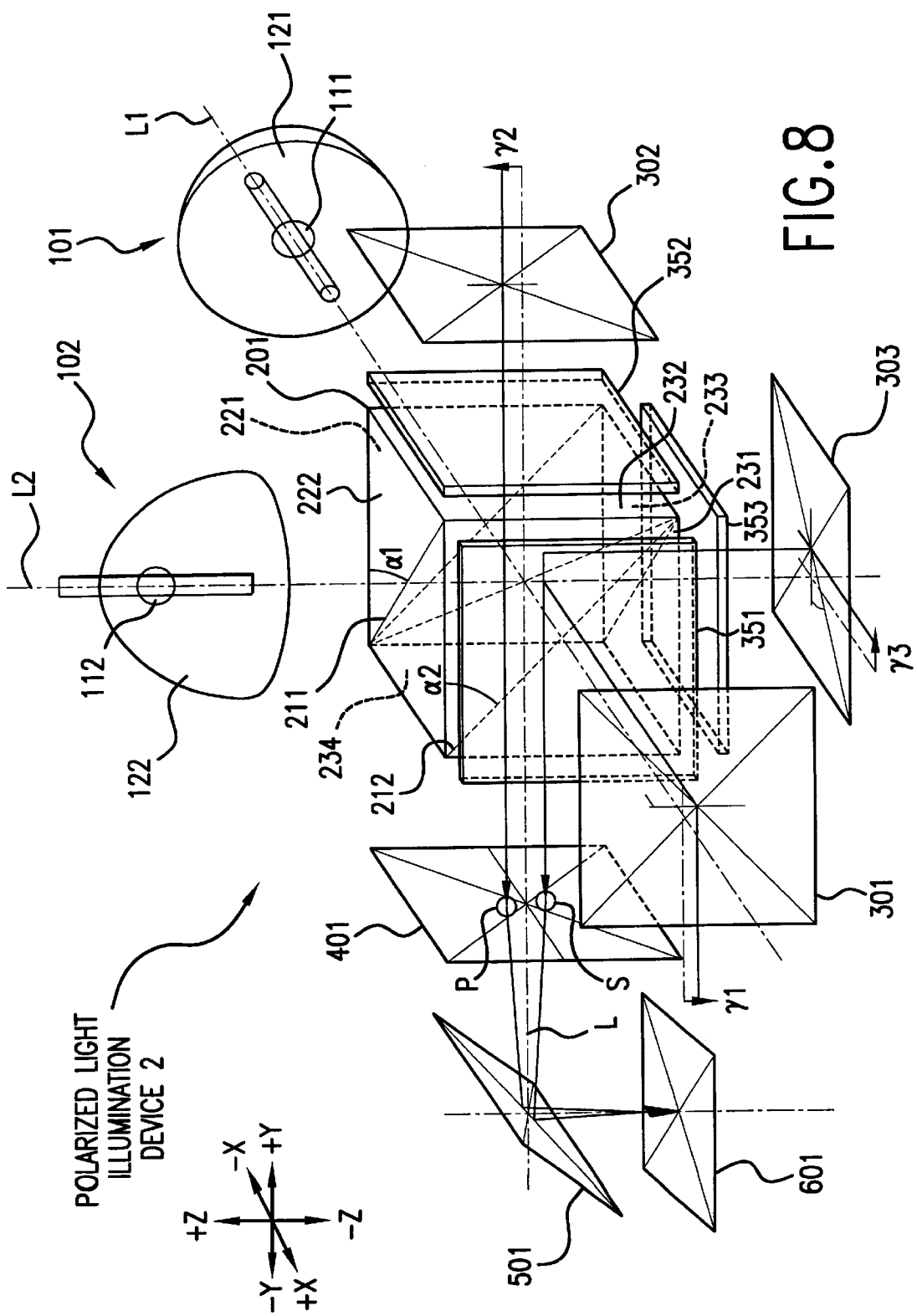
FIG. 8 is a schematic structural view of an optical system constructed in a polarized light illumination device according to a second embodiment of the present invention.

While the first to third light-collecting mirror plates 301, 302, and 303 in the polarized light illumination device 1 shown in FIG. 1 are placed so that secondary light-source images formed by p-polarized light and secondary light-source images formed by s-polarized light are arranged nearly in parallel with the x-axis, the first to third light-collecting mirror plates 301, 302, and 303 may be placed so that secondary light-source images formed by p-polarized light and secondary light-source images formed by s-polarized light are arranged nearly in parallel with the z-axis, as in a polarized light illumination device 2 shown in FIG. 8. In this case, for example, the first light-collecting mirror plate 301 is disposed so that about the center thereof is shifted by $\gamma 1$ from the x-axis in the $-z$ direction, the second light-collecting mirror plate 302 is disposed so that about the center thereof is shifted by $\gamma 2$ from the y-axis in the $+z$ direction, and the third light-collecting mirror plate 303 is disposed so that about the center thereof is shifted by $\gamma 3$ from the z-axis in the $+y$ direction. In this case, the basic principle of the polarized light illumination device is similar to that of the polarized light illumination device 1, and therefore, a detailed description thereof is omitted.

Figure 9:
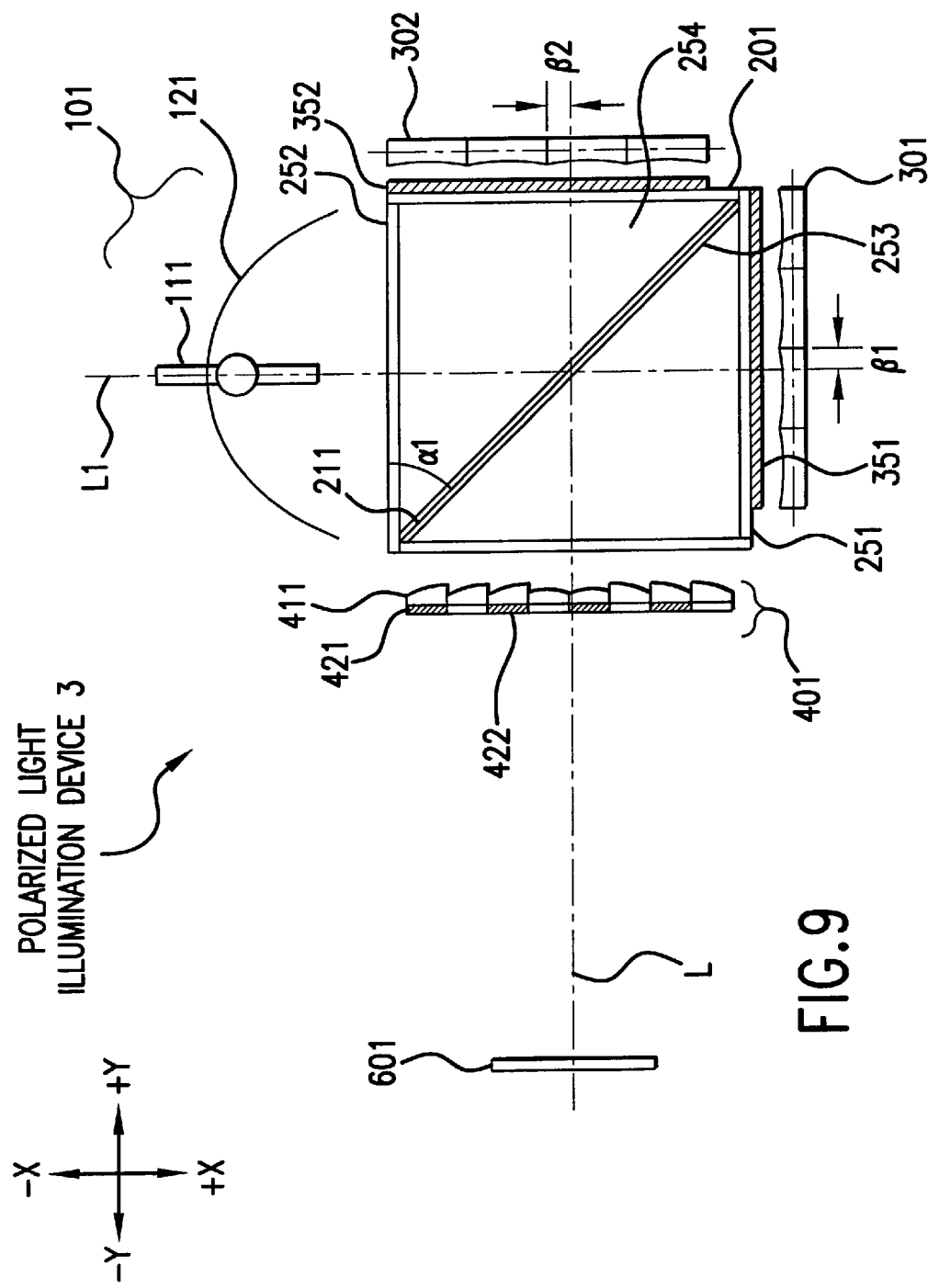
FIG. 9 is a schematic structural view showing the basic structure of an optical system constructed in a polarized light illumination device according to a third embodiment of the present invention.

In a polarized light illumination device 3 shown in FIG. 9 (a cross-sectional view taken along the xy plane), the layout of respective optical systems is almost the same as that in the first embodiment. The polarized light illumination device 3 is, however, characterized in that a prism structure 251 is constituted by six transparent plates 252 forming wall surfaces, that a first polarized light separation flat plate 253 having a first polarization separating film 211 and a second polarized light separation flat plate (not shown. Since the second polarized light separation plate is divided by the first polarized light separation plate 253, exactly, two polarized light separation plates are needed.) having a second polarization separating film (not shown) are placed inside the prism structure 251, and that the structure filled with a liquid 254 is used as a polarized light separating and synthesizing optical element 201. It is necessary that the transparent plates, the first and second polarized light separation plates, and the liquid have almost the same refractive index. This makes it possible to reduce the cost and weight of the polarized light separating and synthesizing optical element 201.

Further, in the polarized light illumination device 3, small lenses constituting a light-collecting lens plate 411 in a light-collecting lens section 401 are formed of decentering lenses, as mentioned in the first embodiment, whereby the light-collecting lens plate 411 also serves the function of a superimposing lens, and the superimposing lens is omitted. This makes it possible to reduce the cost and weight of the polarized light illumination device.

Figure 10:
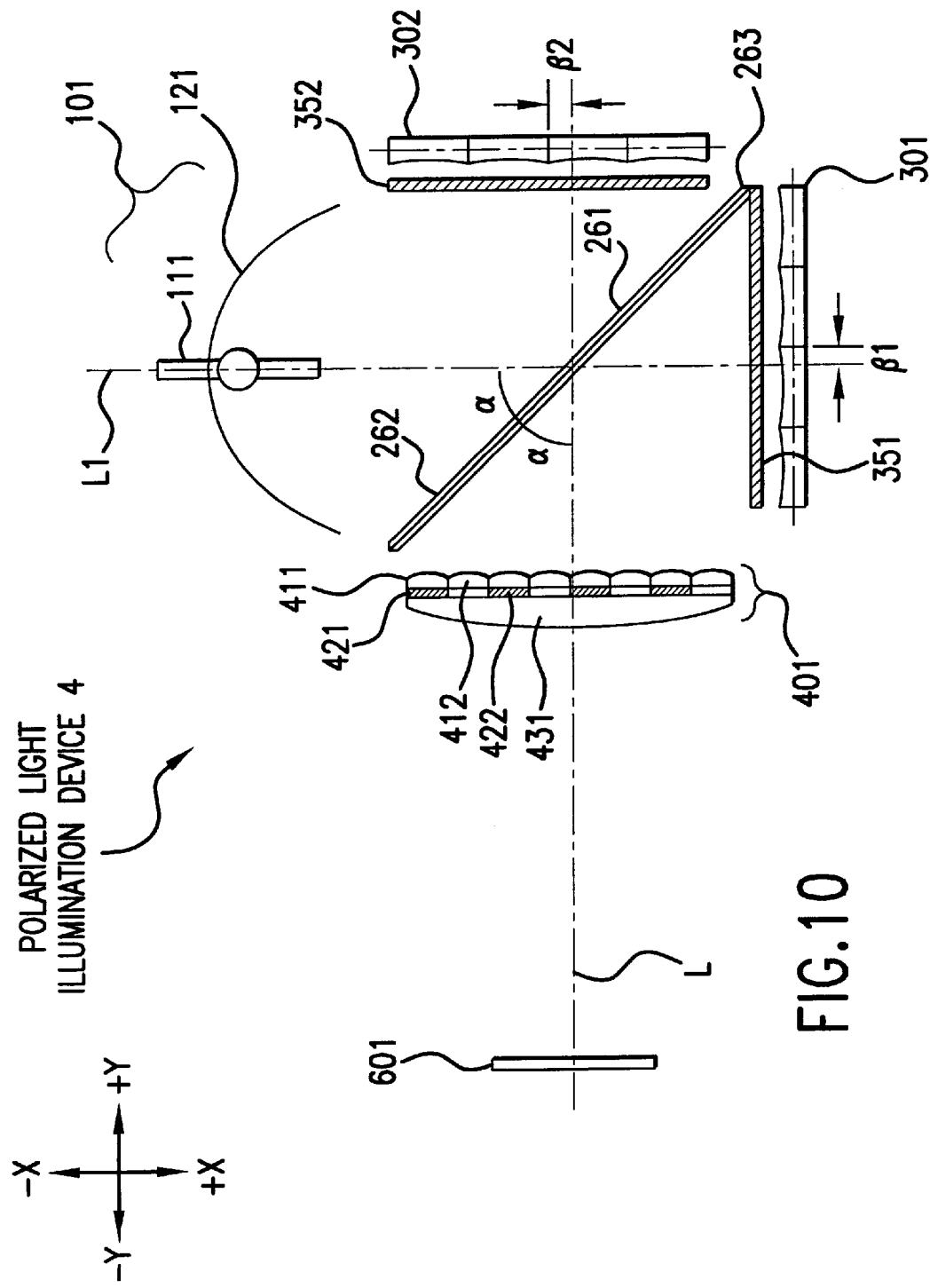
FIG. 10 is a schematic structural view showing the basic structure of an optical system constructed in a polarized light illumination device according to a fourth embodiment of the present invention.

In a polarized light illumination device 4 shown in FIG. 10, the layout of respective optical systems is the same as that in the first embodiment. The polarized light illumination device 4 is characterized in that a polarized light separating and synthesizing optical element 201 is formed of a flat structure. That is, two polarized light separation plates 261 (since one of the polarized light separation plates is separated by the other polarized light separation plate, exactly, three polarized light separation plates are provided), in which a polarized light separation film 262 is sandwiched between two glass substrates 263, are placed at an angle α1=45° with respect to the system optical axis L (L1, L2), whereby they serve almost the same function as that of the polarized light separating and synthesizing optical element 201 using a prism having a hexahedron shape (see FIG. 1). This makes it possible to reduce the cost and weight of the polarized light separating and synthesizing optical element 201. In the polarized light separating and synthesizing optical element 201 of this embodiment, the first to sixth surfaces as in the polarized light separating and synthesizing optical elements 201 of the first to third embodiments do not actually exist. However, it can be imagined that the polarized light separating and synthesizing optical element 201 has first to sixth surfaces, as shown by dotted lines in the figure. Therefore, light sources 201 and 202, λ/4 phase plates 351, 352, and 353, light-collecting mirror plates 301, 302, and 303, a light-collecting lens section 401, and the like are positioned with respect to these first to sixth imaginary surfaces, as in the first to third embodiments mentioned above.

Figure 11:
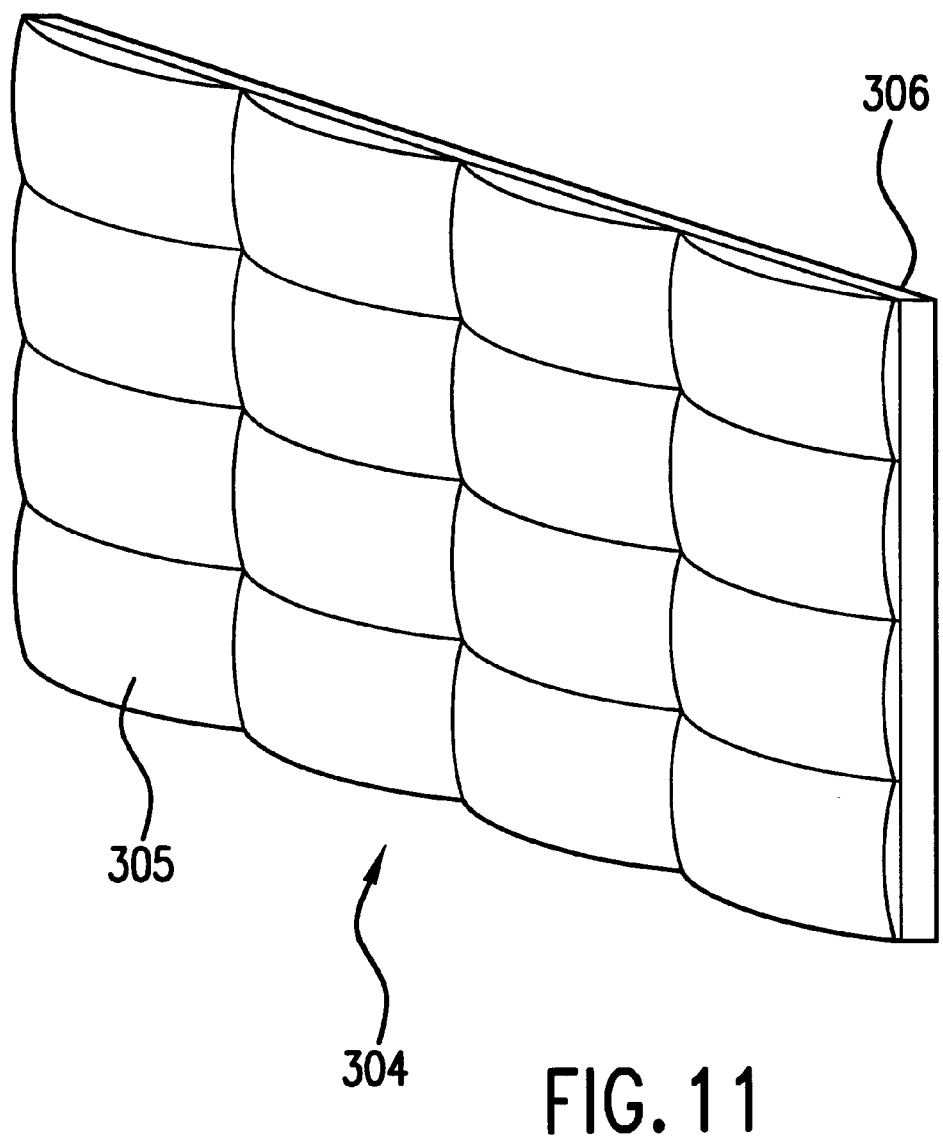
FIG. 11 is a perspective view of a light-collecting mirror plate according to a fifth embodiment, which is able to be used in the polarized light illumination devices of the first to fourth embodiments.

In the above-described polarized light illumination devices 1 to 4, some or all of the first to third light-collecting mirror plates 301, 302, and 303 may be replaced with a light-collecting mirror plate 304 shown in FIG. 11. The light-collecting mirror plate 304 is composed of a plurality of small lenses 305, and a reflecting mirror plate 306.

Further, when the plurality of small lenses 305 in this structure are formed of decentering lenses, light emerging from the small lenses 305 can be directed toward the illumination area 601. Therefore, the first to third light-collecting mirror plates can also serve the function of the superimposing lens 431. Since the superimposing lens 431 can be omitted in this case, it is possible to reduce the cost of the polarized light illumination device.

Figure 12:
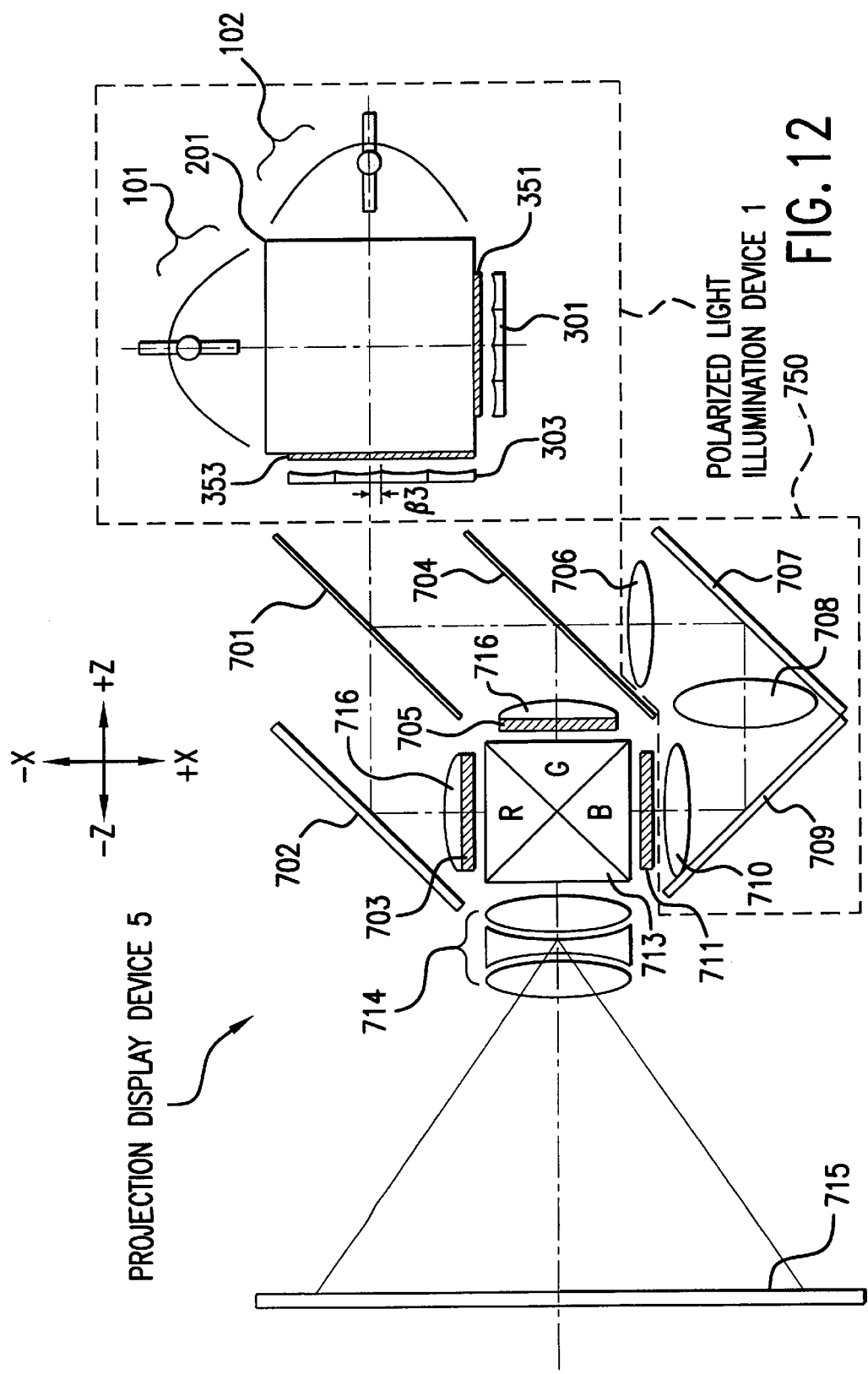
FIG. 12 is a schematic structural view showing the structure in the xz plane of an optical system in an example of a projection display device including the polarized light illumination device shown in FIGS. 1 and 3.
Figure 13:
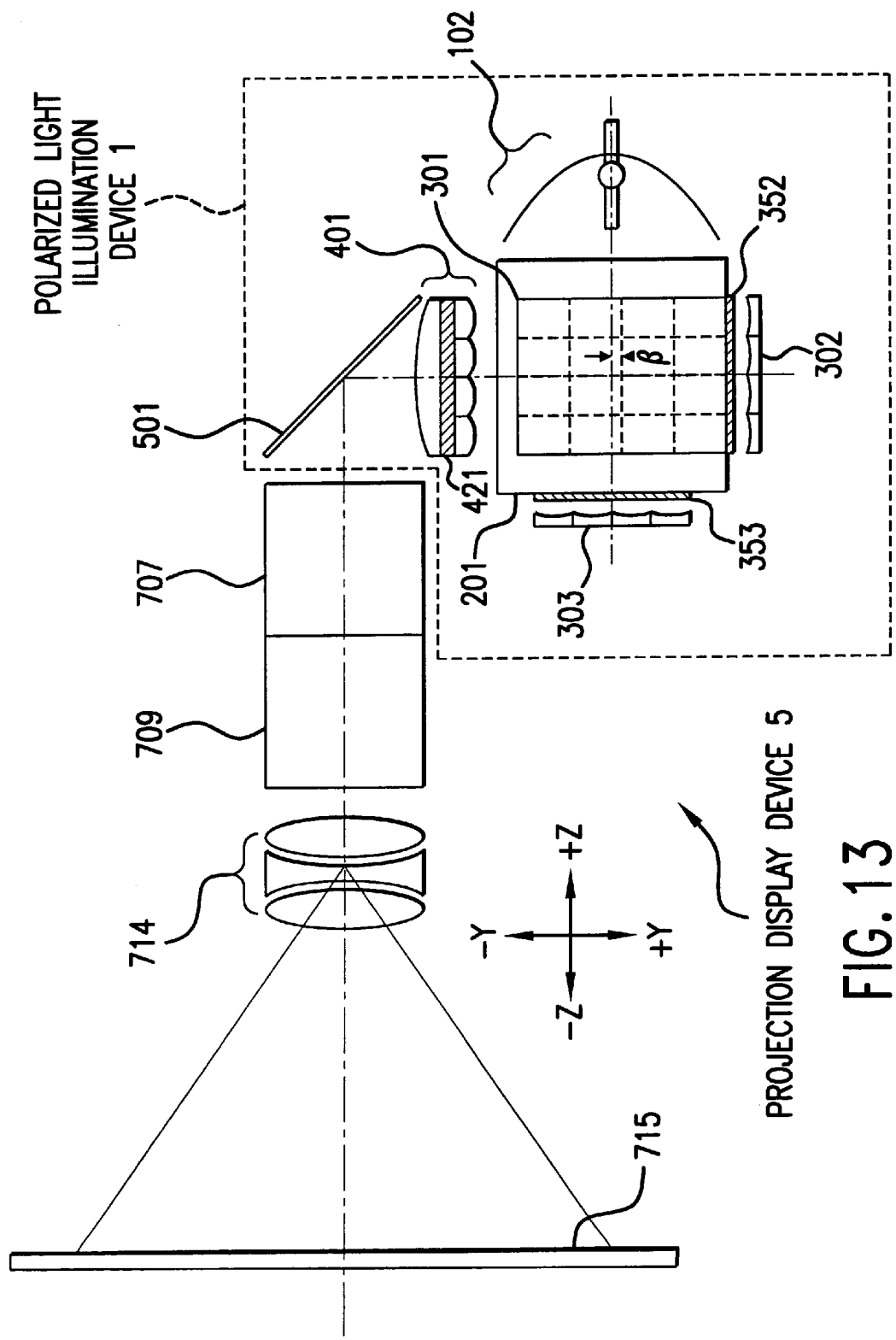
FIG. 13 is a schematic structural view showing the structure in the yz plane of the optical system in the projection display device shown in FIG. 12.

FIGS. 12 and 13 show an example of a projection display device that improves the brightness of a projection image by using the polarized light illumination device 1 of the first embodiment, and of the polarized light illumination devices of the first to fifth embodiments. In a projection display device 5 of this embodiment, light-transmissive liquid crystal light valves are used as optical modulation elements, and two types of light-source lamps having different emission spectrum are used as two light sources in the polarized light illumination device 1. The light-source lamps can be selectively lit. FIG. 12 is a cross-sectional view of the projection display device 5 taken along the xz plane, and FIG. 13 is a cross-sectional view of the projection display device 5 taken along the yz plane. A light-collecting lens section 401, a reflecting mirror 501 that serves as a path changing optical element, and the like are omitted from FIG. 12.

Referring to FIGS. 12 and 13, the polarized light illumination device 1 incorporated in the projection display device 5 of this embodiment includes a first light source 101 and a second light source 102 for emitting randomly polarized light in one direction. Randomly polarized light emitted from these light sources is separated into two types of polarized light by a polarized light separating and synthesizing optical element 201. P-polarized light of the respective separated polarized light is converted into s-polarized light by a λ/2 phase plate 421 in the light-collecting lens section 401, and emerges from the light-collecting lens section in about one type of polarization state (s-polarization state). The polarized light emerging from the light-collecting lens section is caused by the reflecting mirror 501 to change its direction of emission to the −z direction, and enters a blue and green light reflecting dichroic mirror 701.

Red light of illumination light emitted from the polarized light illumination device 1 first passes through the blue and green light reflecting dichroic mirror 701 (colored-light separating optical element), and blue light and green light are reflected thereby. The red light is reflected by a reflecting mirror 702, and reaches a first liquid crystal light valve 703 via a collimator lens 716. Although polarizers are disposed on the incident and emitting sides of the liquid crystal light valve, they are not shown in FIG. 12. On the other hand, the green light of the blue and green light is reflected by a green light reflecting dichroic mirror 704 (colored-light separating optical element), and reaches a second liquid crystal light valve 705 via a collimator lens 716. The collimator lenses 716 disposed on the incident sides of the first and second liquid crystal light valves 703 and 705 serve to improve the illumination efficiency by restraining light for illuminating the light valves from spreading, and to effectively guide light, which is incident from the liquid crystal light valves, to a projection lens that will be described later. On the incident side of a third liquid crystal light valve 711, an emitting-side lens 710 constituting a light guide system 750 is disposed, as will be described later, so as to serve the function of the collimator lenses 716. These collimator lenses may be omitted.

Since the blue light has a longer optical path than those of the other two colored lights, the light guide system 750, which is formed of a relay lens system including an incident-side lens 706, a relay lens 708, and the emitting-side lens 710, is provided for the blue light. That is, blue light, which has passed through the green light reflecting dichroic mirror 704, is first guided to the relay lens 708 via an incident-side lens 706 and a reflecting mirror 707. The blue light is collected by the relay lens 708, and is then guided to the emitting-side lens 710 by a reflecting mirror 709. After that, the blue light reaches the third liquid crystal light valve 711.

The first to third liquid crystal light valves 703, 705, and 711 modulate the colored lights to contain corresponding image information corresponding to each of the colors, and then cause the modulated colored lights to enter a cross-dichroic prism 713 (colored-light synthesizing optical element). The cross-dichroic prism 713 has a structure in which a dielectric multilayer film for reflecting red light and a dielectric multilayer film for reflecting blue light are formed in the shape of a cross, and synthesizes the modulated colored lights. The synthesized light passes through a projection lens 714 (projection optical system), and forms an image on a screen 715.

The projection display device 5 thus structured employs liquid crystal valves that modulate one type of polarized light. Therefore, when randomly polarized light is guided to the light valve by using a conventional illumination device, more than half the randomly polarized light (about 60%) is absorbed by the polarizer and changed into heat, which lowers the light utilization efficiency. Moreover, a large and noisy cooling device is needed to restrict heat generation by the polarizer. In the projection display device 5 of this embodiment, such problems are substantially solved.

In the projection display device 5 of this embodiment, only one polarized light (e.g., p-polarized light) is subjected to the turning action of the polarization plane by the λ/2 phase plate 421 in the polarized light illumination device 1, thereby aligning the polarization plane thereof and the polarization plane of the other polarized light (e.g., s-polarized light). Since the polarized lights polarized in the same direction are guided to the first to third liquid crystal light valves 703, 705, and 711, the light utilization efficiency is improved, and a bright projection image can be obtained. Moreover, since the amount of light to be absorbed by the polarizer is reduced, an increase in temperature of the polarizer is limited. For this reason, it is possible to reduce the size and noise of the cooling device. In addition, since two light sources, the first and second light sources 101 and 102, are provided and the polarization directions of the light emitted from the light sources are aligned without any loss of light, a bright projection image can be obtained. Since dielectric multilayer films, which are thermally stable, are used as the polarization separating films in the polarized light illumination device 1, the polarized light separating ability of the polarized light separating and synthesizing optical element 201 is thermally stable. Consequently, a stable polarized light separating ability is always provided in the projection display device 5 that is needed to produce high light output.

Although the two light sources 101 and 102 are used, since illumination light therefrom can be synthesized without increasing the incident angle (illumination angle) of the illumination light with respect to the illumination area, the cross-sectional area of the illumination light is the same as that in the case in which a single light source is used. Therefore, the amount of light per given area can be double that in the case in which a single light source is used. Consequently, a brighter projection image can be achieved.

Since two types of polarized light emerging from the polarized light separating and synthesizing optical element 201 are separated in the lateral direction in accordance with the display area of the liquid crystal light valve, which is long side to side and serves as an illumination area, in the polarized light illumination device 1, it is possible to efficiently illuminate the illumination area having a rectangular shape that is long from side to side, without wasting the amount of light. Therefore, the polarized light illumination device 1 is suitable for a liquid crystal light valve, which is long from side to side, for projecting an image that is powerful and easy to see.

In addition, since the cross-dichroic prism 713 is used as the colored-light synthesizing optical element in this embodiment, size reduction is possible, and the optical path between the liquid crystal light valves 703, 705, and 711 and the projection lens 714 can be shortened. Therefore, even when a projection lens having a relatively small aperture is used, a bright projection image can be achieved. Although only one of the three optical paths of the respective colored lights has a different length, the light guide system 750 consisting of a relay lens system including the incident-side lens 706, the relay lens 708, and the emitting-side lens 710 is provided for the blue light having the longest optical path in this embodiment, and therefore, inconsistencies in color and the like do not arise.

Since the reflecting mirror 501 that serves as the path-changing optical element is interposed between the light-collecting lens section 401 serving as the polarization conversion optical element and the blue and green light reflecting dichroic mirror 701 in this embodiment, it is possible to change the direction of travel of polarized light emerging from the polarization conversion optical element. This makes it possible to arrange in parallel the plane, in which the colored-light separating optical element, the colored-light synthesizing optical element, the optical modulation device, the projection optical system, and the like are arranged, and the plane including the polarized light illumination device 1 that has two light sources with relatively large dimensions, and to thereby achieve a low-profile projection display device that has a reduced thickness in one direction.

In the polarized light illumination device 1 incorporated in the projection display device 5 of this embodiment, one of the first light source 101 and the second light source 102 may be detachable. According to this structure, for example, when the projection display device 5 is carried, one of the light sources can be detached, thereby improving portability.

In the two light sources 101 and 102 in the polarized light illumination device 1 incorporated in the projection display device 5 of this embodiment, two types of light-source lamps having different emission spectrum and different brightness characteristics are used, and these light-source lamps can be selectively lit. The adoption of such a structure provides the following advantages.

Figure 14A:
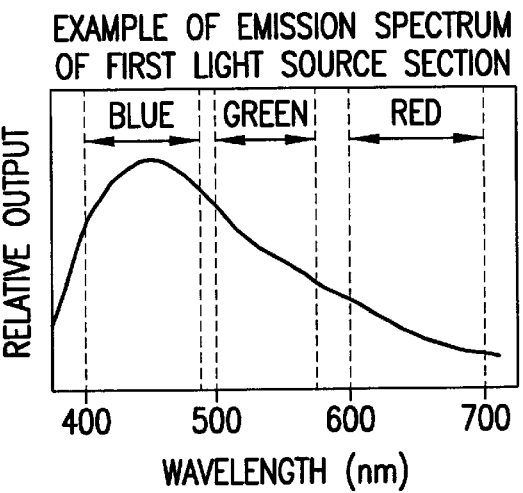
FIG. 14(a)–(c) are explanatory views showing an emission spectrum of light-source lamps in the polarized light illumination device.
Figure 14B:
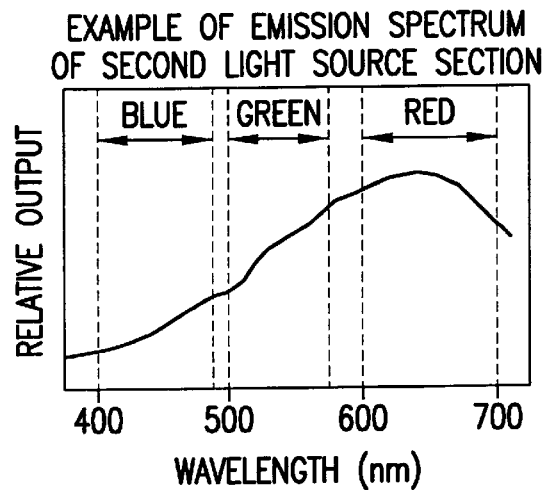
Figure 14C:
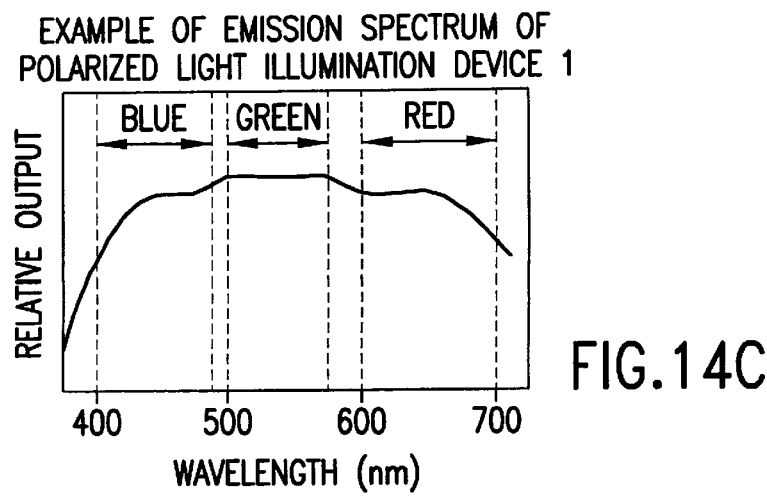

1) By using in combination two types of light-source lamps having different emission spectrum, an ideal illumination device, or an illumination device that is ideal for a projection display device can be achieved. This point will be described by means of an example. For example, it is ideal that a light-source lamp for use in a projection display device produces high light output in all the wavelength regions of blue light, green light, and red light, and that the output is balanced in proportion. Under present conditions, however, such an ideal light-source lamp is rare. FIGS. 14(a)–(c) or explanatory views showing the spectrum of light emitted from the light-source lamp and the polarized light illumination device. In general, most existing light-source lamps, for example, provide a relatively high emission efficiency and a relatively low intensity of red light (this case corresponds to a common high-pressure mercury-vapor lamp) as shown in FIG. 14(a), or provide a relatively high intensity of red light and a relatively low overall emission efficiency (this case corresponds to a certain kind of metal halide lamp) as shown in FIG. 14(b). Under such present conditions of light-source lamps, when two types of light-source lamps having the emission spectrum shown in FIGS. 14(a)–(b) are used and simultaneously lit in the polarized light illumination device 1 of the projection display device 5 of this embodiment, the spectrum of light emitted from the polarized light illumination device 1 can be made ideal, as shown in FIG. 14(c), which makes it possible to easily achieve a projection display device that is able to obtain a high-quality bright projection image.

2) By selectively lighting two types of light-source lamps having different emission spectrum, the hue of a projection image can be appropriately changed to suit the preferences of the viewer.

3) By selectively lighting two types of light-source lamps, the brightness of a projection image can be appropriately changed according to the environment where the projection display device is used, or according to the preferences of the viewer. For example, two light-sources are lit when a projection image is viewed in a light place, and only one of them is selectively lit when a projection image is viewed in a dark place.

4) When two light-source lamps are selectively used, it is possible to extend the lives of the light-source lamps themselves. Moreover, for example, even when one of the light-source lamps is unable to be lit because of its end of life or failure, a projection image can remain displayed by using the other light-source lamp, which improves operability. Further, for example, when the projection display device 5 is driven by a battery, the longevity of the battery can be maintained by selectively lighting only one of the light-source lamps.

Of course, the polarized light illumination devices 2 to 4 mentioned above may be used instead of the polarized light illumination device 1.

The polarized light illumination device of the present invention may be applied to a projection display device that uses reflective-type liquid crystal light valves as optical modulation devices.

Figure 15:
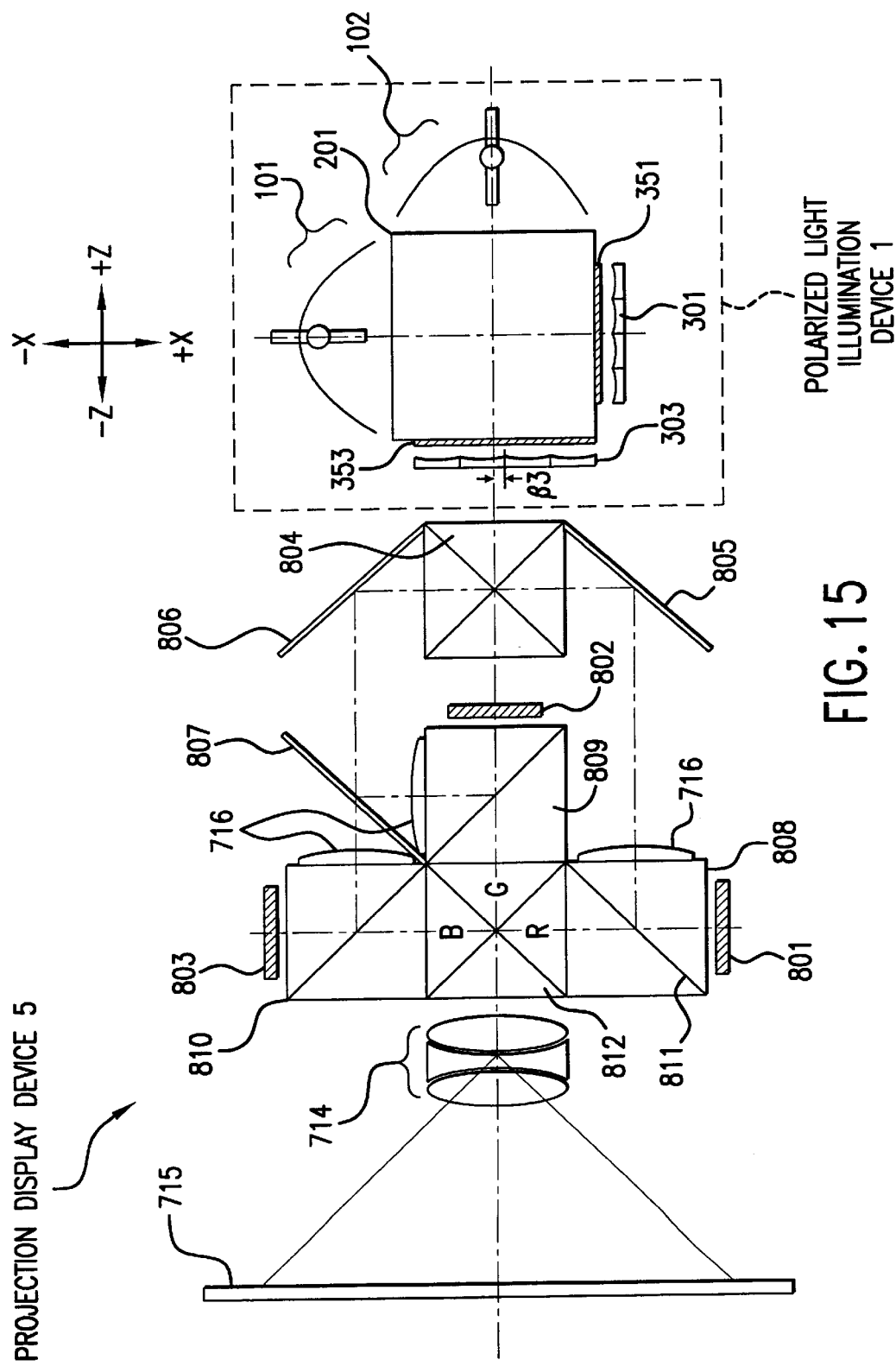
FIG. 15 is a schematic structural view showing the structure in the xz plane of an optical system in another example of a projection display device including the polarized light illumination device shown in FIGS. 1 and 3.

A projection display device 6 shown in FIG. 15 (a cross-sectional view of the projection display device taken along the xz plane) employs the polarized light illumination device 1 of the first embodiment. Randomly polarized light emitted from first and second light sources 101 and 102 is separated into two types of polarized light by a polarized light separating and synthesizing optical element 201. P-polarized light of the respective separated polarized light is converted into s-polarized light by a $\lambda/2$ phase plate (not shown) in a light-collecting lens section (not shown), and illuminates reflective-type liquid crystal light valves 801, 802, and 803 disposed at three positions.

Light emitted from such a polarized light illumination device 1 (although a light-collecting lens section, a reflecting mirror serving as a path-changing optical element, and the like are also provided in this embodiment, similar to the aforesaid projection display device 5, they are omitted) is first separated into red light, blue light, and green light by a colored-light separating cross-dichroic prism 804 (colored-light separating optical element) in which a dielectric multilayer film for reflecting blue light and green light and a dielectric multilayer film for reflecting red light are formed in the shape of a cross. The red light enters a first polarizing beam splitter 808 via a reflecting mirror 805 and a collimator lens 716. On the other hand, the blue light and the green light are reflected by a reflecting mirror 806, and are then separated into green light (reflected light) and blue light (transmitted light) by a green light reflecting dichroic mirror 807 (colored-light separating optical element). The colored lights enter second and third polarizing beam splitters 809 and 810 via collimator lenses 716, respectively. The polarizing beam splitters 808, 809, and 810 (polarized light separating optical elements) at three positions are optical elements that have a polarized light separation surface 811 inside thereof, and that have a polarized light separating function of separating p-polarized light and s-polarized light by transmitting p-polarized light of incident light and reflecting s-polarized light. Since most light emitted from the polarized light illumination device 1 is s-polarized light, most of the colored lights, which are incident on the first to third polarizing beam splitters 808, 809, and 810, are reflected by the polarized light separation surface 811 so that the directions of travel thereof are changed by about 90°, and enter the adjoining first to third reflective-type liquid crystal light valves 801, 802, and 803. In some cases, however, a small amount of polarized light that is polarized in a direction different from that of the s-polarized light (e.g., p-polarized light) is mixed in the colored lights that are incident on the first to third polarizing beam splitters 808, 809, and 810. Since such polarized light polarized in the different direction passes unchanged through the polarized light separation surface 811 and emerges without changing its direction of travel inside the polarizing beam splitter, it does not serve as light for illuminating the reflective-type liquid crystal light valve. The function of the collimator lenses 716 placed on the incident sides of the polarizing beam splitters is the same as that of the collimator lenses 716 used in the projection display device 5 described in the sixth embodiment. Therefore, collimator lenses may be interposed between the polarizing beam splitters and the reflective-type liquid crystal light valves in another embodiment. These collimator lenses may be omitted.

Light that is incident on the reflective-type liquid crystal light valves (s-polarized light) is subjected to optical modulation by the respective liquid crystal light valves according to image information from the outside. Specifically, the polarization directions of light to be emitted from the reflective-type liquid crystal light valves are changed according to display information, and the directions of travel of the light are approximately reversed, and the light is emitted from the reflective-type liquid crystal light valves. The light emerging from the reflective-type liquid crystal light valve enters again the polarizing beam splitter. In this case, since the emitting light from the respective reflective-type liquid crystal light valve is partially converted into p-polarized light according to the display information, only p-polarized light is permitted by a polarized light separating function to pass through the polarizing beam splitter (in this stage, a display image is formed), and reaches a colored-light synthesizing cross-dichroic prism 812. The colored lights that are incident on the colored-light synthesizing cross-dichroic prism 812 (colored-light synthesizing optical element) are synthesized into one optical image, and projected as a color image onto a screen 715 by a projection lens 714 (projection optical system).

In this way, since the projection display device 6 including reflective-type liquid crystal light valves also employ reflective-type liquid crystal light valves that modulate one type of polarized light, if randomly polarized light is guided to the reflective-type liquid crystal light valves by using a conventional illumination device, more than half the randomly polarized light (about 60%) is absorbed by the polarizer, and changed into heat. Therefore, the conventional illumination device provides a low light utilization efficiency, and needs a large and noisy cooling device to restrict the heat generation by the polarizer. Such problems are substantially solved by the projection display device 6 of this embodiment.

In the projection display device 6 of this embodiment, only one of the polarized lights (e.g., p-polarized light) is subjected to a rotatory polarization action by a λ/2 phase plate (not shown) in the polarized light illumination device 1 so that the polarization plane thereof and the polarization plane of the other polarized light (e.g., s-polarized light) are aligned. Since the polarized lights polarized in the same direction are guided to the first to third reflective-type liquid crystal light valves 801, 802, and 803, the light utilization efficiency is improved, whereby a bright projection image is obtained. Moreover, since the amount of light to be absorbed by the polarizer is reduced, the increase in temperature of the polarizer is limited. This permits the reduction in size and noise of the cooling device. Further, since two light sources, the first and second light sources 101 and 102, are provided and the polarization directions of emitting lights from the light sources are aligned without any loss, a bright projection image can be obtained. Since the polarized light illumination device 1 uses dielectric multilayer films that are thermally stable as polarization separating films, the polarized light separating ability of the polarized light separating and synthesizing optical element 201 is thermally stable. For this reason, the projection display device 6, which needs to produce a high light output, can always show a stable polarized light separating ability.

Although two light sources 101 and 102 are used, since illumination light therefrom can be synthesized without increasing the incident angle (illumination angle) of the illumination light with respect to the illumination area, the cross-sectional area of the illumination area is the same as that in the case where a single light source is used. Therefore, the amount of light per given area can be double that in the case where a single light source is used. As a result, a brighter projection image can be achieved.

Since a reflecting mirror (not shown) that serves as a path-changing optical element is also interposed between a light-collecting lens section (not shown) that serves as a polarization conversion element and the colored-light separating cross-dichroic prism 804 in the projection display device 6 of this embodiment, it is possible to achieve a low-profile projection display device that has a reduced thickness in one direction, as mentioned in the sixth embodiment.

In the projection display device 6 of this embodiment, as mentioned above, it also may be possible to detachably mount one of the first and second light sources 101 and 102, to use two types of light-source lamps having different emission spectrum and different brightness characteristics as the first and second light sources 101 and 102, or to selectively light the two light-source lamps, whereby the abovementioned advantages can be obtained.

Polarizers may be disposed on the incident sides of the polarizing beam splitters 808, 809, and 810, and on the emitting sides of the polarizing beam splitters 808, 809, and 810 or on the emitting side of the colored-light synthesizing cross-dichroic prism. In this case, there is a possibility that the contrast ratio of a display image may be improved.

Of course, the polarized light illumination devices 2 to 4 mentioned above may be used instead of the polarized light illumination device 1.

In the projection display device using transmissive-type liquid crystal light valves, the polarized light illumination device of the present invention may be applied to what is called a mirror optical system in which a colored-light synthesizing optical element is formed by two dichroic mirrors instead of the cross-dichroic prism 713 used in the projection display device 5 of the sixth embodiment. In the case of the mirror optical system, since the optical path lengths between the three liquid crystal light valves and the polarized light illumination device can be made equal, effective illumination with few inconsistencies in brightness and color can be produced without using the light guide system 750 described in the first embodiment.

While p-polarized light is converted into s-polarized light by the light-collecting lens section 401 and s-polarized light is used as illumination light in any of the embodiments mentioned above, conversely, s-polarized light may be converted into p-polarized light and p-polarized light may be used as illumination light. In this case, the phase layers 422 of the λ/2 phase plate 421 are placed at the positions where secondary light-source images are formed by s-polarized light. Further, the polarization planes may be unified by subjecting both p-polarized light and s-polarized light to the rotatory polarization action. In this case, the phase layers are placed at the positions where secondary light-source images are formed by both the polarized lights.

In the above embodiments, it is assumed that the λ/2 phase plate and the λ/4 phase plate are formed of common polymeric films. These phase plates may be formed by twisted nematic liquid crystal (TN liquid crystal). When TN liquid crystal is used, the wavelength dependency of the phase plates can be reduced. Therefore, the polarization conversion ability of the λ/2 phase plate and the λ/4 phase plate can be improved, compared with the case where common polymeric films are used.

In the polarized light illumination device of the present invention, randomly polarized light emitted from the first and second light sources is separated into two types of polarized light by the polarized light separating and synthesizing optical element, and then, the respective polarized light is guided to predetermined areas, thereby aligning the directions of polarization. Since most of the polarized light radiated from the first and second light sources can be aligned into p-polarized light or s-polarized light, and radiated onto an illumination area in a synthesized state, the illumination area can be brightly illuminated. Although two light sources are used, since illumination light from the two light sources can be synthesized without increasing the incident angle (illumination angle) of the illumination light with respect to the illumination area, the cross-sectional area of the illumination light is the same as that in the case where a single light source is used. Therefore, the amount of light per given area can be made double that in the case where a single light source is used. In this respect, the illumination area can be illuminated more brightly.

What is claimed is:

1. A polarized light illumination device comprising:
a polarized light separating and synthesizing optical element having a first polarization separating film that separates light, incident from a first side, into two types of polarized lights, emits one of the two types of polarized lights toward a third side, and emits another of the two types of polarized lights toward a fourth side, and a second polarization separating film that separates light, incident from a second side, into the two types of polarized lights, emits one of the two types of polarized lights toward said fourth side, and emits another of the two types of polarized lights toward a fifth side;

a first light source and a second light source that cause light to enter said first side and said second side of said polarized light separating and synthesizing optical element, respectively;

a first light collecting and reflecting optical element disposed on said third side of said polarized light separating and synthesizing optical element and having a plurality of small light collecting and reflecting elements that approximately reverse a direction of travel of respective incident light and forming a focal image;

a second light collecting and reflecting optical element disposed on said fourth side of said polarized light separating and synthesizing optical element and having a plurality of small light collecting and reflecting elements that approximately reverse a direction of travel of respective incident light and forming a focal image;

a third light collecting and reflecting optical element disposed on said fifth side of said polarized light separating and synthesizing optical element and having a plurality of small light collecting and reflecting elements that approximately reverse a direction of travel of respective incident light and forming a focal image;

a first polarization-state conversion optical element disposed between said third side of said polarized light separating and synthesizing optical element and said first light collecting and reflecting optical element;

a second polarization-state conversion optical element disposed between said fourth side of said polarized light separating and synthesizing optical element and said second light collecting and reflecting optical element;

a third polarization-state conversion optical element disposed between said fifth side of said polarized light separating and synthesizing optical element and said third light collecting and reflecting optical element; and a polarization conversion optical element, disposed on a sixth side of said polarized light separating and synthesizing optical element, that aligns a polarization direction of light emitted from said polarized light separating and synthesizing optical element, a first principal ray of light, which is reflected by said small light collecting and reflecting elements in said first light collecting and reflecting optical element and said third light collecting and reflecting optical element and which enters said polarization conversion optical element, and a second principal ray of light, which is reflected by said small light collecting and reflecting elements in said second light collecting and reflecting optical element and which enters said polarization conversion optical element, being in parallel with each other and do not overlap each other.

2. The polarized light illumination device according to claim 1, said first light collecting and reflecting optical element being disposed nearly in parallel with said third side of said polarized light separating and synthesizing optical element, said second light collecting and reflecting optical element being disposed nearly in parallel with said fourth side of said polarized light separating and synthesizing optical element, said third light collecting and reflecting optical element being disposed nearly in parallel with said fifth side of said polarized light separating and synthesizing optical element, and said first light collecting and reflecting optical element, said second light collecting and reflecting optical element, and said third light collecting and reflecting optical element being arranged so that the first principal ray of light, (which is reflected by said small light collecting and reflecting elements in said first light collecting and reflecting optical element and said third light collecting and reflecting optical element and which enters said polarization conversion optical element), and the second principal ray of light, (which is reflected by said small light collecting and reflecting elements in said second light collecting and reflecting optical element and which enters said polarization conversion optical element), being in parallel with each other and do not overlap each other.

3. The polarized light illumination device according to claim 1, the aperture shape of said small light collecting and reflecting elements being similar to that of an illumination area.

4. The polarized light illumination device according to claim 1, a light-collecting optical element having a plurality of light-collecting elements being disposed on an incident side or an emitting side of said polarization conversion optical element to collect light emitted from said polarized light separating and synthesizing optical element.

5. The polarized light illumination device according to claim 1, a superimposing optical element that superimposes light emitted from said polarization conversion optical element onto an illumination area being disposed on an emitting side of said polarization conversion optical element.

6. The polarized light illumination device according to claim 1, a path-changing optical element that changes the optical path of light emitted from said polarization conversion optical element being disposed on an emitting side of said polarization conversion optical element.

7. The polarized light illumination device according to claim 1, said small light collecting and reflecting elements in said first light collecting and reflecting optical element, said second light collecting and reflecting optical element, and said third light collecting and reflecting optical element being formed of curved reflecting mirrors.

8. The polarized light illumination device according to claim 1, wherein said small light collecting and reflecting elements in said first light collecting and reflecting optical element, said second light collecting and reflecting optical element, and said third light collecting and reflecting optical element being composed of lenses, and reflecting surfaces formed on a side of said lenses which is opposite to said polarized light separating and synthesizing optical element.

9. A projection display device comprising:

a) a polarized light illumination device that includes:

a polarized light separating and synthesizing optical element having a first polarization separating film that separates light, incident from a first side, into two types of polarized lights, emits one of the two types of polarized lights toward a third side, and emits another of the two types of polarized lights toward a fourth side, and a second polarization separating film that separates light, incident from a second side, into the two types of polarized lights, emits one of the two types of polarized lights toward said fourth side, and emits another of the two types of polarized lights toward a fifth side;

a first light source and a second light source that cause light to enter said first side and said second side of said polarized light separating and synthesizing optical element, respectively;

a first light collecting and reflecting optical element disposed on said third side of said polarized light separating and synthesizing optical element and having a plurality of small light collecting and reflecting elements that approximately reverse a direction of travel of respective incident light and forming a focal image;

a second light collecting and reflecting optical element disposed on said fourth side of said polarized light separating and synthesizing optical element and having a plurality of small light collecting and reflecting elements that approximately reverse a direction of travel of respective incident light and forming a focal image;

a third light collecting and reflecting optical element disposed on said fifth side of said polarized light separating and synthesizing optical element and having a plurality of small light collecting and reflecting elements that approximately reverse a direction of travel of respective incident light and forming a focal image;

a first polarization-state conversion optical element disposed between said third side of said polarized light separating and synthesizing optical element and said first light collecting and reflecting optical element;

a second polarization-state conversion optical element disposed between said fourth side of said polarized light separating and synthesizing optical element and said second light collecting and reflecting optical element;

a third polarization-state conversion optical element disposed between said fifth side of said polarized light separating and synthesizing optical element and said third light collecting and reflecting optical element; and a polarization conversion optical element, disposed on a sixth side of said polarized light separating and synthesizing optical element, that aligns a polarization direction of light emitted from said polarized light separating and synthesizing optical element, a first principal ray of light, which is reflected by said small light collecting and reflecting elements in said first light collecting and reflecting optical element and said third light collecting and reflecting optical element and which enters said polarization conversion optical element, and a second principal ray of light, which is reflected by said small light collecting and reflecting elements in said second light collecting and reflecting optical element and which enters said polarization conversion optical element, being in parallel with each other and do not overlap each other;

b) an optical modulation element that modulates light emitted from said polarized light illumination device; and c) a projection optical system that projects the light modulated by said optical modulation element.

10. The projection display device according to claim 9, at least one of said first light source and said second light source being detachable.

11. The projection display device according to claim 9, at least one of said first light source and said second light source being selectively lit.

12. A projection display device comprising:

a) a polarized light illumination device that includes:

a polarized light separating and synthesizing optical element having a first polarization separating film that separates light, incident from a first side, into two types of polarized lights, emits one of the two types of polarized lights toward a third side, and emits another of the two types of polarized lights toward a fourth side, and a second polarization separating film that separates light, incident from a second side, into the two types of polarized lights, emits one of the two types of polarized lights toward said fourth side, and emits another of the two types of polarized lights toward a fifth side;

a first light source and a second light source that cause light to enter said first side and said second side of said polarized light separating and synthesizing optical element, respectively;

a first light collecting and reflecting optical element disposed on said third side of said polarized light separating and synthesizing optical element and having a plurality of small light collecting and reflecting elements that approximately reverse a direction of travel of respective incident light and forming a focal image;

a second light collecting and reflecting optical element disposed on said fourth side of said polarized light separating and synthesizing optical element and having a plurality of small light collecting and reflecting elements that approximately reverse a direction of travel of respective incident light and forming a focal image;

a third light collecting and reflecting optical element disposed on said fifth side of said polarized light separating and synthesizing optical element and having a plurality of small light collecting and reflecting elements that approximately reverse a direction of travel of respective incident light and forming a focal image;

a first polarization-state conversion optical element disposed between said third side of said polarized light separating and synthesizing optical element and said first light collecting and reflecting optical element;

a second polarization-state conversion optical element disposed between said fourth side of said polarized light separating and synthesizing optical element and said second light collecting and reflecting optical element;

a third polarization-state conversion optical element disposed between said fifth side of said polarized light separating and synthesizing optical element and said third light collecting and reflecting optical element; and a polarization conversion optical element, disposed on a sixth side of said polarized light separating and synthesizing optical element, that aligns a polarization direction of light emitted from said polarized light separating and synthesizing optical element, a first principal ray of light, which is reflected by said small light collecting and reflecting elements in said first light collecting and reflecting optical element and said third light collecting and reflecting optical element and which enters said polarization conversion optical element, and a second principal ray of light, which is reflected by said small light collecting and reflecting elements in said second light collecting and reflecting optical element and which enters said polarization conversion optical element, being in parallel with each other and do not overlap each other;

b) a colored-light separating optical element that separates light emitted from said polarized light illumination device into a plurality of colored lights;

c) a plurality of optical modulation elements that modulate the colored lights separated by said colored-light separating optical element;

d) a colored-light synthesizing optical element that synthesizes the lights modulated by said plurality of optical modulation elements; and e) a projection optical system that projects the light synthesized by said colored-light synthesizing optical element.

13. The projection display device according to claim 12, at least one of said first light source and said second light source being detachable.

14. The projection display device according to claim 12, at least one of said first light source and said second light source being selectively lit.

15. A projection display device comprising:

a) a polarized light illumination device that includes:

a polarized light separating and synthesizing optical element having a first polarization separating film that separates light, incident from a first side, into two types of polarized lights, emits one of the two types of polarized lights toward a third side, and emits another of the two types of polarized lights toward a fourth side, and a second polarization separating film that separates light, incident from a second side, into the two types of polarized lights, emits one of the two types of polarized lights toward said fourth side, and emits another of the two types of polarized lights toward a fifth side;

a first light source and a second light source that cause light to enter said first side and said second side of said polarized light separating and synthesizing optical element, respectively;

a first light collecting and reflecting optical element disposed on said third side of said polarized light separating and synthesizing optical element and having a plurality of small light collecting and reflecting elements that approximately reverse a direction of travel of respective incident light and forming a focal image;

a second light collecting and reflecting optical element disposed on said fourth side of said polarized light separating and synthesizing optical element and having a plurality of small light collecting and reflecting elements that approximately reverse a direction of travel of respective incident light and forming a focal image;

a third light collecting and reflecting optical element disposed on said fifth side of said polarized light separating and synthesizing optical element and having a plurality of small light collecting and reflecting elements that approximately reverse a direction of travel of respective incident light and forming a focal image;

a first polarization-state conversion optical element disposed between said third side of said polarized light separating and synthesizing optical element and said first light collecting and reflecting optical element;

a second polarization-state conversion optical element disposed between said fourth side of said polarized light separating and synthesizing optical element and said second light collecting and reflecting optical element;

a third polarization-state conversion optical element disposed between said fifth side of said polarized light separating and synthesizing optical element and said third light collecting and reflecting optical element; and a polarization conversion optical element, disposed on a sixth side of said polarized light separating and synthesizing optical element, that aligns a polarization direction of light emitted from said polarized light separating and synthesizing optical element, a first principal ray of light, which is reflected by said small light collecting and reflecting elements in said first light collecting and reflecting optical element and said third light collecting and reflecting optical element and which enters said polarization conversion optical element, and a second principal ray of light, which is reflected by said small light collecting and reflecting elements in said second light collecting and reflecting optical element and which enters said polarization conversion optical element, being in parallel with each other and do not overlap each other;

b) a reflective-type optical modulation element that modulates light emitted from said polarized light illumination device;

c) a polarized light separating optical element that separates a plurality of polarized light components contained in the light emitted from said polarized light illumination device and the light modulated by said reflective-type optical modulation element; and d) a projection optical system that projects the light modulated by said reflective-type optical modulation element and emitted via said polarized light separating optical element.

16. The projection display device according to claim 15, at least one of said first light source and said second light source being detachable.

17. The projection display device according to claim 15, at least one of said first light source and said second light source being selectively lit.

18. A projection display device comprising:

a) a polarized light illumination device that includes:

a polarized light separating and synthesizing optical element having a first polarization separating film that separates light, incident from a first side, into two types of polarized lights, emits one of the two types of polarized lights toward a third side, and emits another of the two types of polarized lights toward a fourth side, and a second polarization separating film that separates light, incident from a second side, into the two types of polarized lights, emits one of the two types of polarized lights toward said fourth side, and emits another of the two types of polarized lights toward a fifth side;

a first light source and a second light source that cause light to enter said first side and said second side of said polarized light separating and synthesizing optical element, respectively;

a first light collecting and reflecting optical element disposed on said third side of said polarized light separating and synthesizing optical element and having a plurality of small light collecting and reflecting elements that approximately reverse a direction of travel of respective incident light and forming a focal image;

a second light collecting and reflecting optical element disposed on said fourth side of said polarized light separating and synthesizing optical element and having a plurality of small light collecting and reflecting elements that approximately reverse a direction of travel of respective incident light and forming a focal image;

a third light collecting and reflecting optical element disposed on said fifth side of said polarized light separating and synthesizing optical element and having a plurality of small light collecting and reflecting elements that approximately reverse a direction of travel of respective incident light and forming a focal image;

a first polarization-state conversion optical element disposed between said third side of said polarized light separating and synthesizing optical element and said first light collecting and reflecting optical element;

a second polarization-state conversion optical element disposed between said fourth side of said polarized light separating and synthesizing optical element and said second light collecting and reflecting optical element;

a third polarization-state conversion optical element disposed between said fifth side of said polarized light separating and synthesizing optical element and said third light collecting and reflecting optical element; and a polarization conversion optical element, disposed on a sixth side of said polarized light separating and synthesizing optical element, that aligns a polarization direction of light emitted from said polarized light separating and synthesizing optical element, a first principal ray of light, which is reflected by said small light collecting and reflecting elements in said first light collecting and reflecting optical element and said third light collecting and reflecting optical element and which enters said polarization conversion optical element, and a second principal ray of light, which is reflected by said small light collecting and reflecting elements in said second light collecting and reflecting optical element and which enters said polarization conversion optical element, being in parallel with each other and do not overlap each other;

b) a colored-light separating optical element that separates light emitted from said polarized light illumination device into a plurality of colored lights;

c) a plurality of reflective-type optical modulation elements that modulate the colored lights separated by said colored-light separating optical element;

d) a plurality of polarized light separating optical elements that separate a plurality of polarized light components contained in the respective colored lights separated by said colored-light separating optical element and the colored lights respectively modulated by said reflective-type optical modulation elements;

e) a colored-light synthesizing optical element that synthesizes the colored lights respectively modulated by said reflective-type optical modulation elements and respectively emitted via said polarized light separating optical elements; and f) a projection optical system that projects the light synthesized by said colored-light synthesizing optical element.

19. The projection display device according to claim 18, at least one of said first light source and said second light source being detachable.

20. The projection display device according to claim 18, at least one of said first light source and said second light source being selectively lit.

* * * * *